(12) United States Patent
Martinka et al.

(10) Patent No.: US 12,043,153 B2
(45) Date of Patent: Jul. 23, 2024

(54) HEADREST FOR A SEAT, AND SEAT, IN PARTICULAR A VEHICLE SEAT

(71) Applicant: Adient US LLC, Plymouth, MI (US)

(72) Inventors: Michal Martinka, Nove Mesto nad Vahom (SK); Miroslav Rezbarik, Trencin (SK); Christophe Moriniere, Holtzheim (FR)

(73) Assignee: Adient US LLC, Plymouth, MI (US)

( * ) Notice: Subject to any disclaimer, the term of this patent is extended or adjusted under 35 U.S.C. 154(b) by 56 days.

(21) Appl. No.: 17/996,659

(22) PCT Filed: Apr. 20, 2021

(86) PCT No.: PCT/EP2021/060165
§ 371 (c)(1),
(2) Date: Oct. 20, 2022

(87) PCT Pub. No.: WO2021/214017
PCT Pub. Date: Oct. 28, 2021

(65) Prior Publication Data
US 2023/0133442 A1 May 4, 2023

(30) Foreign Application Priority Data

Apr. 23, 2020 (DE) ...................... 10 2020 205 185.2
Aug. 5, 2020 (DE) ...................... 10 2020 120 639.9

(51) Int. Cl.
*B60N 2/818* (2018.01)
*B60N 2/815* (2018.01)

(52) U.S. Cl.
CPC ............. *B60N 2/818* (2018.02); *B60N 2/815* (2018.02)

(58) Field of Classification Search
CPC ........ B60N 2/815; B60N 2/818; B60N 2/812; B60N 2/809; A47C 7/38
See application file for complete search history.

(56) References Cited

U.S. PATENT DOCUMENTS 7,562,936 B1  7/2009  Veine et al.
7,871,129 B2  1/2011  Boes et al.
(Continued)

FOREIGN PATENT DOCUMENTS

DE  102010030783 A1  1/2011
EP    3153347 A1  12/2017
(Continued)

OTHER PUBLICATIONS

European Patent Office, International Search Report and Written Opinion in Application No. PCT/EP2021/060165, dated Jun. 14, 2021, 10 pages, Rijswijk, Netherlands.

*Primary Examiner* — Milton Nelson, Jr.
(74) *Attorney, Agent, or Firm* — Marshall & Melhorn, LLC

(57) ABSTRACT

A headrest for a seat may have a headrest body, a support element having a rod end, and a base support element. The base support element is connected to the headrest body and the height can be adjusted relative to the support element using same. The headrest may also have a locking element for locking the base support element in an adjusted height position on the support element. The locking element may have a locking region and an actuation region. The locking region extends perpendicular to a transverse extension direction of the base support element and may be detachably blocked in a locked position. The actuation region extends from the base support element in a vertical direction. By actuating the actuation region, the locking region can be moved away from the bearing opening. A seat having a headrest of this type is also provided.

15 Claims, 22 Drawing Sheets

(56) References Cited

U.S. PATENT DOCUMENTS

| | | |
|---|---|---|
| 9,475,414 B2 | 10/2016 | Mueller et al. |
| 10,358,070 B2 | 7/2019 | Diefenthaler et al. |
| 2011/0006578 A1 | 1/2011 | Veine et al. |

FOREIGN PATENT DOCUMENTS

| | | |
|---|---|---|
| FR | 2987792 A1 | 9/2013 |
| FR | 3069499 A1 | 2/2019 |

HEADREST FOR A SEAT, AND SEAT, IN PARTICULAR A VEHICLE SEAT

FIELD

The invention relates to a headrest for a seat, in particular vehicle seat, comprising at least one headrest body, one support element having at least one rod end for mounting the headrest body, a main support element having at least one bearing opening through which the rod end is routed, wherein the main support element is connected to the headrest body and conjointly with the latter is height-adjustable relative to the support element, and a locking element for locking the main support element in an adjusted height position on the support element, wherein the locking element has at least one locking region and one activation region. The invention moreover relates to a vehicle seat.

BACKGROUND

Various height-adjustable headrests which are height-adjustable relative to a backrest of a seat are known from the prior art.

US 2011/0006578 A1 and U.S. Pat. No. 7,562,936 B1 disclose in each case a headrest for a seat, in particular a vehicle seat, comprising at least one headrest body, one support element having at least one rod end for mounting the headrest body, one main support element having at least one bearing opening through which the rod end is routed, wherein the main support element is connected to the headrest body and conjointly with the latter is height-adjustable relative to the support element, and one locking element for locking the main support element in an adjusted height position on the support element, wherein the locking element has at least one locking region and one activation region.

EP 3 153 347 A1 discloses a headrest, comprising a headrest housing, a U-shaped headrest rod which comprises one transverse rod and two vertical support rods, a main support element which comprises two sliding sleeves, wherein the two vertical support rods of the headrest rod are in each case routed through two sliding sleeves, wherein the sliding sleeves are able to slide in a vertical direction on the vertical support rods.

SUMMARY

The invention is based on the object of improving a headrest of the type mentioned at the outset, in particular of specifying a simple and improved height-adjustable headrest. The intention is in particular to provide a headrest in which an activation element for unlocking the headrest can be disposed at different positions by replacing as few components as possible. Moreover, the invention is based on the object of providing a vehicle seat having a corresponding headrest.

This object is achieved according to the invention by a headrest for a seat, in particular vehicle seat, comprising at least one headrest body, one support element having at least one rod end for mounting the headrest body, one main support element having at least one bearing opening through which the rod end is routed, wherein the main support element is connected to the headrest body and conjointly with the latter is height-adjustable relative to the support element, and one locking element for locking the main support element in an adjusted height position on the support element, wherein the locking element has at least one locking region and one activation region. The locking region extends so as to be substantially perpendicular to a direction of transverse extent of the main support element, and in a locked position is releasably secured on the bearing opening. The activation region extends from the main support element in a vertical direction. The locking region by activating the activation region is movable away from the bearing opening.

The height direction is preferably largely parallel, in particular parallel, to a vertical direction, in particular a vehicle vertical direction. The direction of transverse extent preferably runs parallel to a transverse direction, in particular a vehicle transverse direction.

As a result of the locking region extending so as to be substantially perpendicular to a direction of transverse extent of the main support element and in a locked position being releasably secured on the bearing opening, and the activation region extending from the main support element in a height direction, and the locking region by activating the activation region being able to be moved away from the bearing opening, an activation element for unlocking the locking element can be disposed at different positions, in particular at different positions in the vertical direction, without having to adapt the locking element to the vertical position of the activation element. In this way, the locking element can be a common part of a modular headrest construction kit in which the activation element is able to be disposed at different positions by selecting different headrest bodies.

The headrest is height-adjustable. The headrest preferably has a main support element and disposed therein a holding element which is able to be guided so as to be displaceable in terms of height in a height direction, in particular the vertical direction. The holding element can serve for receiving and mounting a headrest body, in particular a single-part or multiple-part headrest body. For configuring a guide of the headrest body in order for the height position of the latter to be adjusted, the main support element preferably comprises a number of bearings, in particular friction bearings, for example sliding or guiding sleeves by which the headrest body is mounted so as to be height-adjustable relative to a support element.

For configuring a securing mechanism of the headrest body in an adjusted height position, a locking element which is movable relative to the main support element between an unlocking position and a locking position is preferably provided. The locking element is configured, for example, as a spring wire, in particular a spring wire bracket or a spring wire loop.

The holding element preferably comprises at least one clearance for the locking element and at least one clearance for an activation element. The activation element can be movably mounted in the holding element and, for locking or unlocking the locking element, can be brought to engage with the locking element. In one preferred embodiment, the headrest body comprises a holding element which is disposed on the main support element and conjointly with the latter is displaceable in terms of height relative to the support element.

The main support element here is preferably able to be releasably fixed to the at least one support element. The support element can be held on a seat, in particular a vehicle seat. When the main support element is unlocked, the headrest body by the bearings is preferably mounted on the support element so as to be displaceable in terms of height relative to the support element. The headrest body can be held on the vehicle seat by the at least one support element, and by the main support element and the locking element be releasably fixed to the support element. The support element is configured, for example, as a U-shaped support bracket or as two support rods.

For fixing the headrest body in an adjusted height position on the support element, the support element preferably comprises form-fitting means and force-fitting means, in particular notches, wherein the locking element in the locked state of the headrest engages in a form-fitting and force-fitting manner in one of the notches. The locking element here is specified in such a manner that said locking element in the locked or secured position thereof is pre-tensioned. The headrest furthermore preferably has the activation element by way of which the locking element can be transferred to the non-secured position, as a result of which the adjustment of a height position of the headrest body is made possible in that the headrest body is moved, in particular displaced, upward or downward relative to the support element.

The locking element can be configured as a spring wire, the fastening region thereof being fastened to the main support element, in particular being held in a form-fitting and force-fitting manner thereon, and the locking region of said locking element being able to be releasably secured on the main support element. An activation region of the locking element can extend from the main support element in the height direction, in particular project from the main support element in the height direction. The activation region can be specified in such a manner that, when the activation element engages in a punctiform manner at any arbitrary location in the activation region of the locking element, the locking element is unlocked and is actuated from the locked position to the unlocked position such that the headrest body is freely movable, in particular displaceable in terms of height. By releasing or not activating the activation element, the locking element is preferably actuated automatically, for example by a spring force of the spring wire, to the locked position on the main support element such that the headrest body is locked, thus fixedly held in the height direction.

Moreover, at least one end of the activation region that protrudes from the main support element forms an upper height detent for an assembled position of the activation element on the headrest body, and the main support element, in particular a surface side, forms a lower height detent for an assembled position of the activation element on the headrest body.

The advantages achieved by the invention lie inter alia in that a headrest body of the height-adjustable headrest is particularly easily adjustable also in the vehicle height direction and in that the headrest has a particularly compact construction mode and is simple to assemble. The aspect of comfort and safety for a vehicle occupant is improved when using the headrest according to the invention.

In one embodiment, the main support element has two mutually spaced-apart bearing openings, and the locking element has two locking regions that correspond to the bearing openings.

In one preferred embodiment, the at least one locking region and the activation region of the locking element are integrally configured. The locking element is preferably formed from a spring wire which is bent multiple times, in particular from an integral spring wire. Said spring wire, for example by deformation, displaces the at least one locking region in the direction of transverse extent of the main support element when the activation region is activated.

The at least one locking region can be disposed so as to be displaceable on a surface side of the main support element, and be configured so as to run substantially perpendicularly to the direction of transverse extent of the main support element. The at least one locking region is in particular disposed so as to be substantially perpendicular to the direction of transverse extent of the main support element in the region of the bearing opening. The activation region is configured so as to be substantially U-shaped, C-shaped, J-shaped or L-shaped and protrudes from the locking region so as to be substantially perpendicular to the latter. The locking region preferably runs substantially along a horizontal plane. The activation region preferably runs substantially along a vertical plane.

The headrest body can comprise an activation element which is coupled to the activation region of the locking element. For coupling the activation element to the activation region, the activation element can bear on the activation region, or be operatively connected directly or indirectly to the activation region, in such a manner that a movement of the activation region results from a movement of the activation element at least in one direction.

The at least one bearing opening can have a slot-shaped opening, wherein the at least one locking region in a locked state of the main support element is disposed in the opening and as a result the main support element is secured on the rod end of the support element. For example, the at least one locking region in a locked state of the main support element is disposed in the opening and is securely engaged with the support element, in particular with the rod end.

The main support element can comprise at least one bearing which is held in the bearing opening of the main support element and by which the headrest body is mounted on the support element so as to be height-adjustable relative to the latter.

The object is moreover achieved by a seat, in particular a vehicle seat. The seat comprises at least one backrest and one headrest according to the above description, said headrest being disposed on the backrest.

Advantageous design embodiments which can be used individually or in combination are the subject matter of the dependent claims.

DESCRIPTION OF THE FIGURES

The invention is explained in more detail hereunder using advantageous exemplary embodiments illustrated in the figures. However, the invention is not limited to these exemplary embodiments. In the figures.

DETAILED DESCRIPTION

Equivalent parts are provided with the same reference signs in all figures.

Figure 1:
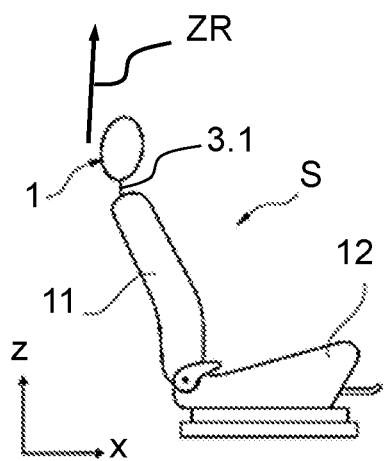
FIG. 1: shows a lateral view of a vehicle seat according to the invention, having a headrest according to the invention.

A vehicle seat S, which is schematically illustrated in FIG. 1, will be discussed hereunder by using three spatial directions that run so as to be mutually perpendicular. In a vehicle seat S installed in the vehicle, a longitudinal direction x runs largely horizontally and is preferably parallel to a vehicle longitudinal direction which corresponds to the usual travel direction of the vehicle. A transverse direction y, running perpendicularly to the longitudinal direction x, is likewise horizontally aligned in the vehicle and runs parallel to a vehicle transverse direction. A vertical direction z runs perpendicularly to the longitudinal direction x and perpendicularly to the transverse direction y. In a vehicle seat S installed in the vehicle, the vertical direction z preferably runs parallel to a vehicle height axis.

The designations used for positions and directions such as, for example, front, rear, top and bottom refer to a viewing direction of an occupant sitting in a normal sitting position in the vehicle seat S, wherein the vehicle seat S is installed in the vehicle and is in a use position, with an upright backrest 11, suitable for transporting passengers and aligned as customary in the travel direction. However, the vehicle seat S according to the invention can also be installed in an alignment deviating therefrom, for example so as to be transverse to the travel direction.

Figure 2:
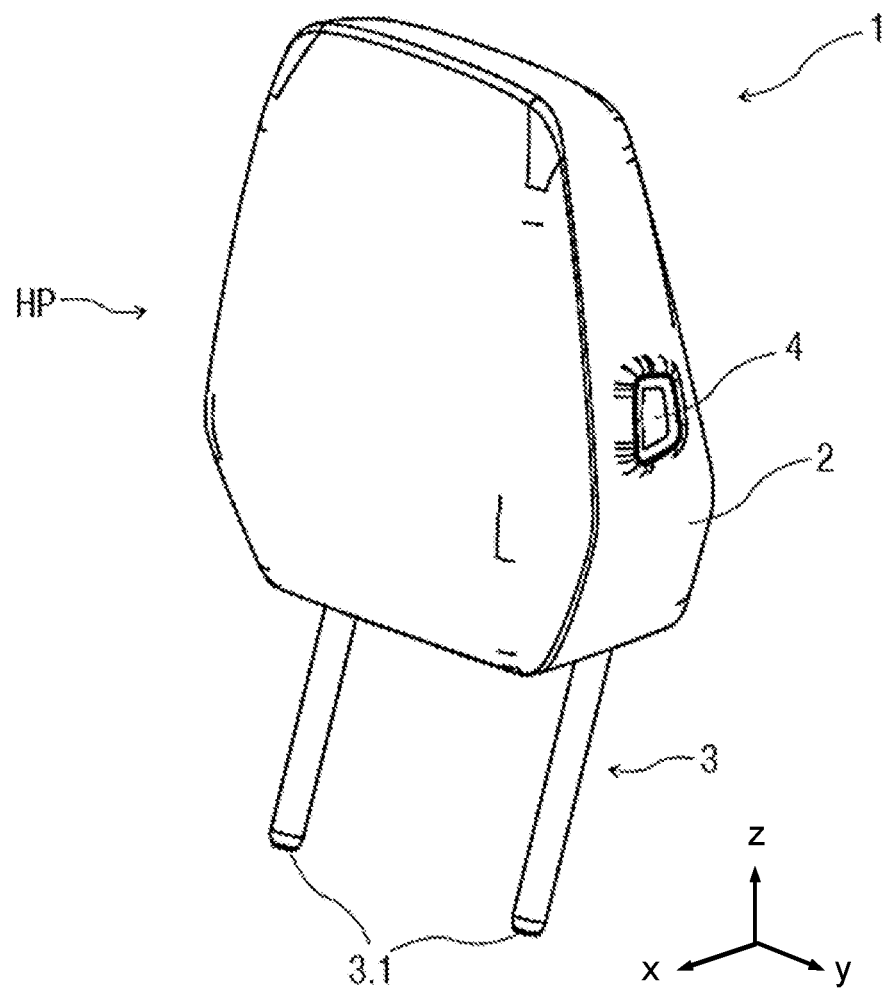
FIG. 2: shows a headrest according to the invention in a perspective illustration.

The vehicle seat S has the backrest 11 and a seat part 12. A headrest 1 according to the invention is disposed on the backrest 11. FIG. 2 schematically shows the headrest 1 having a height-adjustable headrest body 2 in a perspective view. The headrest body 2 can be produced from natural materials, or from a plastics material, or from a combination of the two.

The headrest body 2 is disposed on a support element 3. The support element 3 in turn is able to be disposed on the vehicle seat S, preferably able to be fastened to the latter. The support element 3 is presently embodied as a bent metal wire. The support element 3 has two rod ends 3.1 which can be inserted into corresponding guide sleeves of the vehicle seat S and which are connected to one another by a transverse rack. The support element 3 is preferably integrally produced. The two rod ends 3.1 serve for receiving the headrest body 2 in a height-adjustable manner, and thus a manner adjustable in the vertical direction z.

An activation element 4, for adjusting the height of the headrest body 2 relative to the support element 3, is disposed on the headrest body 2, a securing mechanism of the headrest body 2 in a height position HP being able to be released by activating said activation element 4, as a result of which the headrest body 2 is freely movable up or down (presently largely in and counter to the vertical direction z) and thus is displaceable in terms of height. The wording "largely parallel to the vertical direction z" is also to include angular deviations from the vertical direction z that are the result in particular of an adjustment of the backrest 11 to a comfortable angle. These angular deviations may be up to 30 degrees in relation to the vertical direction z.

Figure 3:
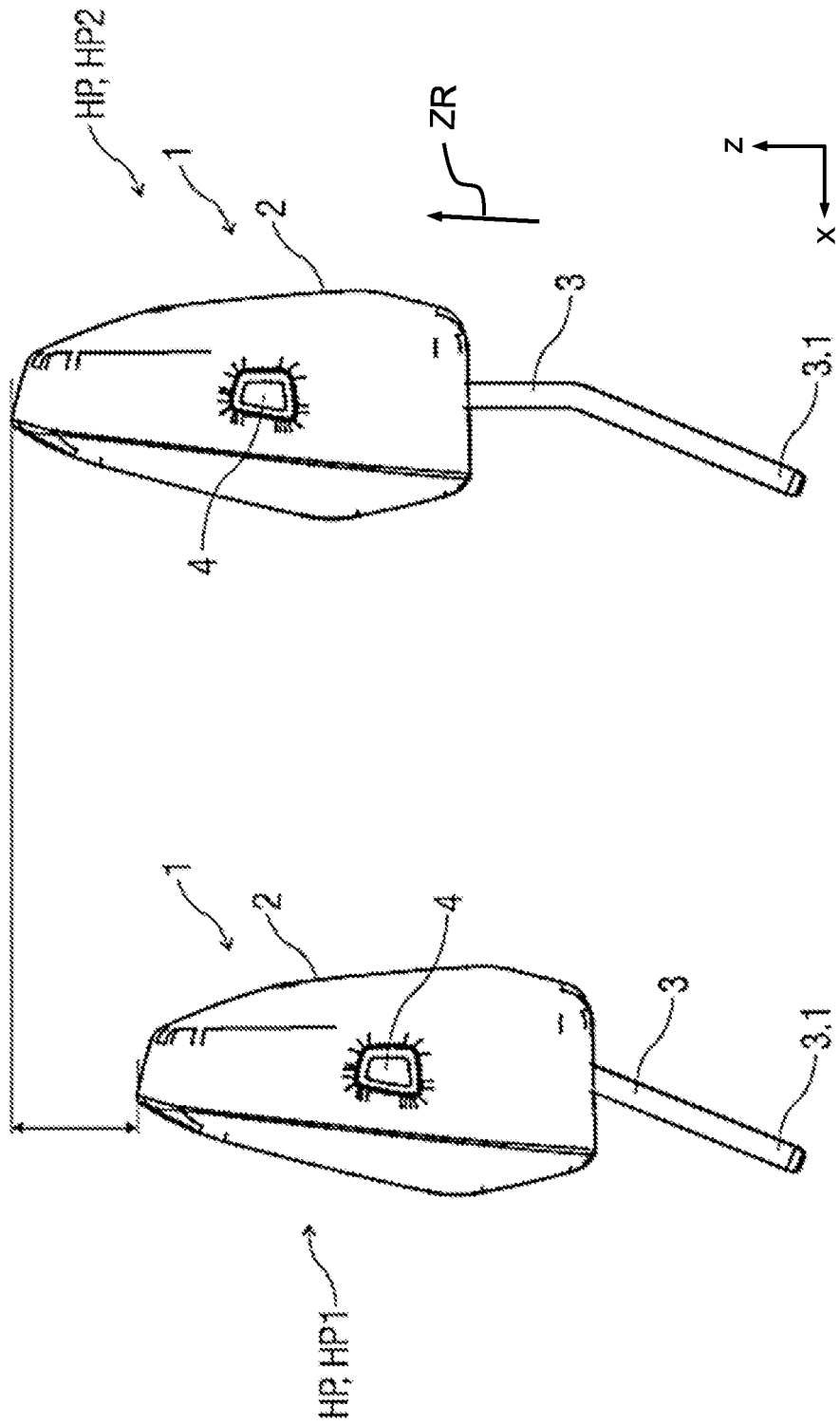
FIG. 3A: shows a lateral view of a headrest according to the invention, wherein a headrest body is disposed in a lower height position.
FIG. 3B: shows a further lateral view of the headrest according to the invention, wherein the headrest body is disposed in an upper height position.

The headrest body 2, in particular largely parallel to the vertical direction z, is height-adjustable in steps and is selectively able to be releasably secured in one of the plurality of height positions HP. The steps of the height positions HP are a lower height position HP1, an upper height position HP2, and a plurality of height positions HP disposed between the lower height position HP1 and the upper height position HP2. FIG. 3A shows the headrest 1, wherein the headrest body 2 is secured in a height position HP1, the latter being a lower height position relative to the support element 3. FIG. 3B shows the headrest body 2 in a height position HP2, the latter being an upper height position relative to the support element 3.

The headrest body 2 is selectively able to be releasably secured in the lower height position HP1, in the upper height position HP2 or in steps in any of the height positions HP between the lower height position HP1 and the upper height position HP2.

Figure 4:
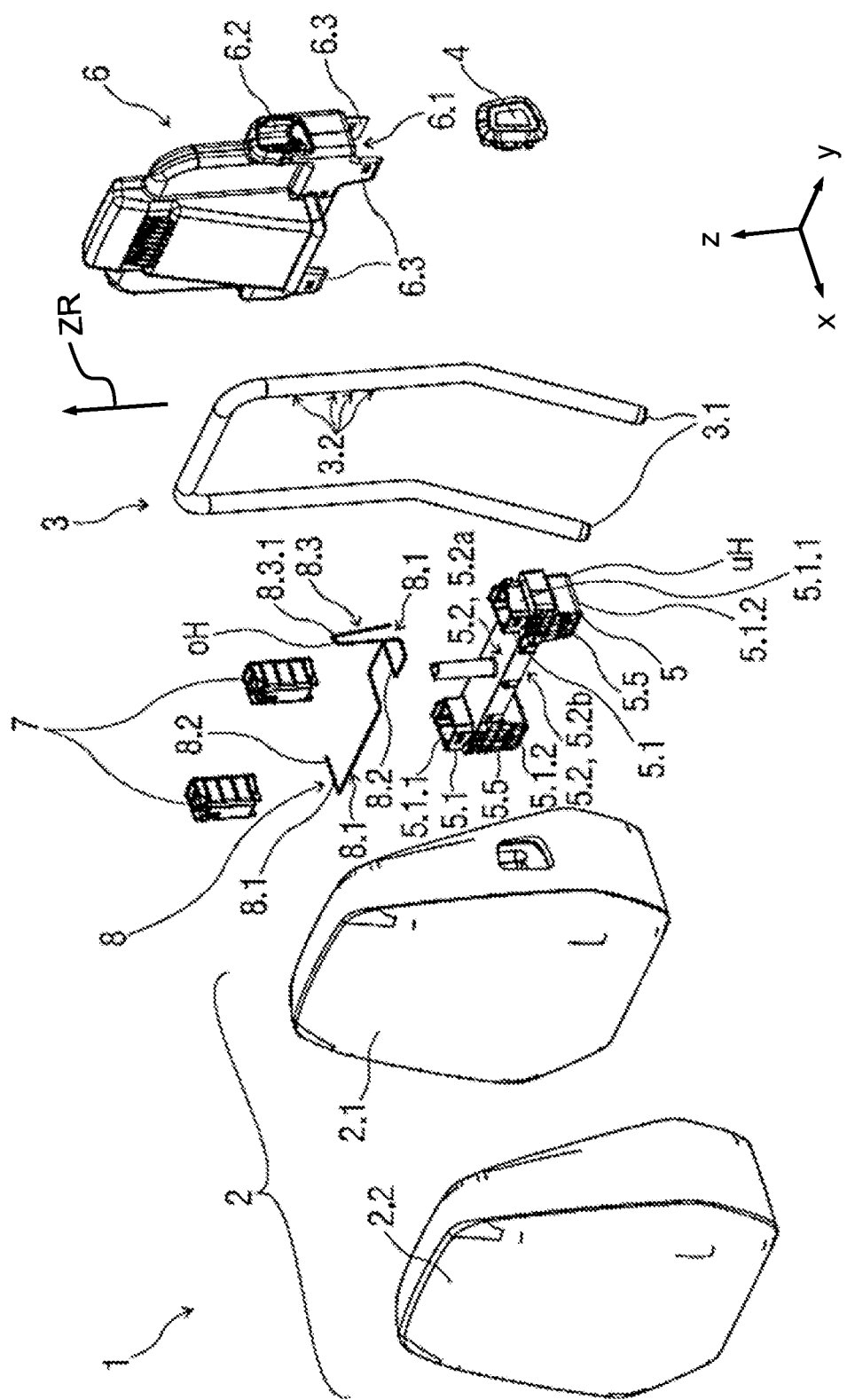
FIG. 4: shows an exploded illustration of a first embodiment of a headrest according to the invention.

FIG. 4 in an exploded illustration shows a first embodiment of a headrest 1 according to the invention. The headrest 1 comprises a main support element 5 and disposed thereon a holding element 6. The main support element 5 by a locking element 8 is releasably fixed in an adjusted height position HP on the support element 3. The main support element 5 and the holding element 6 here are mounted on the support element 3 so as to be displaceable in terms of height in the vertical direction z relative to the support element 3. The support element 3 in the exemplary embodiment is configured as a U-shaped support bracket. Alternatively, the support element 3 can be configured as a pair of support rods. The support element 3 can be formed from a plastics material or from a metal or a metal alloy.

The main support element 5 is formed from a plastics material, in particular a high-strength plastics material. The main support element 5 is held so as to be releasably fixed on the at least one support element 3. The support element 3 is held in the customary manner on the vehicle seat S, this not being illustrated in more detail here.

The holding element 6 serves for receiving and mounting the headrest body 2. The headrest body 2 is formed, for example, from a foam material body 2.1 and a covering element 2.2. Alternatively, the headrest body 2 can be formed integrally, in particular from a cushion, or be configured in multiple parts. The main support element 5 and the holding element 6 fastened thereto are manually height-adjustable, in particular displaceable in terms of height, relative to the support element 3.

For configuring a guide of the headrest body 2, in particular of the main support element 5, for adjusting the height position HP of the headrest body 2, the main support element 5 in the first embodiment comprises two bearings 7, in particular friction bearings, by which the headrest body 2 is mounted on the support element 3 so as to be height-adjustable relative to the latter.

The bearings 7 are disposed and held in a form-fitting and force-fitting manner in bearing openings 5.1 of the main support element 5. The bearing openings 5.1 have appendages 5.1.1 and 5.1.2 that protrude upward and downward from the main support element 5. The appendages 5.1.1 and 5.1.2 here protrude beyond an upper surface side 5.2a and a lower surface side 5.2b of the main support element 5. At least the upper appendages 5.1.1, in particular the external contours thereof, are configured so as to correspond to clearances 6.1 of the holding element 6, in particular so as to correspond to the internal contours thereof, so as to connect the holding element 6 and the main support element 5 to one another.

The holding element 6 can additionally comprise fastening means 6.3, in particular latching tabs having latching openings, which protrude from the clearances 6.1 in the direction of the main support element 5. The main support element 5 can additionally have corresponding fastening means 5.5. The corresponding fastening means 5.5 are, for example, latching receptacles, for example latching cams, which are configured on the external contour of the lower appendages 5.1.2. In an assembled state of the holding element 6, in particular in a state in which the latter is attached to the main support element 5, the fastening means 6.3 of the holding element 6 are disposed in the region of the appendages 5.1.1, 5.1.2. The corresponding fastening means 5.5 of the main support element 5 come to engage with the latching opening of the latching tabs. As a result, the holding element 6 is releasably connected to the main support element 5, in particular snapped into the latter.

For securing the headrest body 2 in an adjusted height position HP, a locking element 8, which is movable between an unlocking position and a locking position relative to the main support element 5, is provided. The locking element 8 is configured, for example, as a spring wire, in particular a spring wire bracket or a spring wire loop. Since the geometry of the spring wire slightly varies when the locking element 8 is activated, terms such as substantially, approximately and largely are used hereunder, for example largely parallel or largely perpendicular. These terms are to include deviations, in particular deviations from an exact parallelism or perpendicularity, and are the result of production tolerances, measuring tolerances and an orderly activation of the locking element 8.

The holding element 6 comprises at least one clearance 6.1 for the locking element 8, and at least one clearance 6.2 for the activation element 4. The activation element 4 is mounted in the receptacle 6.2 of the holding element 6 so as to be movable in the latter. For unlocking or locking the locking element 8, the activation element 4 is operatively connected to the locking element 8. The locking element 8 is able to be transferred to the non-securing position by the activation element 4. In the non-securing position of the locking element 8, the adjustment of a height position HP of the headrest body 2 is made possible in that the headrest body 2 is movable, in particular displaceable, up or down relative to the support element 3.

The headrest body 2, in the case of an unlocked main support element 5, is mounted on the support element 3 by the bearings 7 so as to be displaceable in terms of height in the vertical direction z relative to the support element 3.

For fixing the headrest body 2 in the adjusted height position HP thereof on the support element 3, the support element 3 comprises a plurality of form-fitting means and force-fitting means 3.2, in particular notches. The form-fitting means and the force-fitting means 3.2 are disposed so as to be mutually offset in the vertical direction z. Each of the plurality of form-fitting means and force-fitting means 3.2 is assigned to a height position HP. In a locked state of the headrest 1, the locking element 8 engages in a form-fitting and force-fitting manner with one of the form-fitting means and force-fitting means 3.2. The locking element 8 is preferably specified, in particular pretensioned, in such a manner that said locking element 8 is biased in the direction of the engagement with one of the form-fitting means and force-fitting means 3.2, that is to say pretensioned to either the locking or securing position thereof.

The locking element 8 is presently configured as a spring wire and comprises a fastening region 8.1, a locking region 8.2 and an activation region 8.3. The locking element 8 is fastened to the main support element 5, in particular held thereon in a form-fitting and force-fitting manner, by the fastening region 8.1. The headrest 1 is fixed and held on the support element 3 by the locking region 8.2. The locking element 8 is actuated from a locking position to an unlocking position, or vice versa, by the activation region 8.3.

The activation region 8.3 runs in a height direction ZR. The height direction ZR is largely parallel, in particular parallel, to the vertical direction z. The working "largely parallel to the vertical direction z" is intended to also include angular deviations from the vertical direction z, which are in particular the result of an adjustment of the backrest 11 to a comfortable angle. These angular deviations can be up to 30 degrees in relation to the vertical direction z.

The activation region 8.3 runs largely perpendicular, in particular perpendicular, to the locking region 8.2. The activation region 8.3 runs largely perpendicular, in particular perpendicular, to the locking region 8.2. The fastening region 8.1 can be a sub-region of the activation region 8.3 and/or of the locking region 8.2.

The activation region 8.3 extends from the main support element 5 perpendicularly upward, parallel to the vertical direction z. In particular, the activation region 8.3 projects from the main support element 5 in the vertical direction z. The activation region 8.3 is configured so as to be U-shaped. To this end, the locking element 8 in the activation region 8.3 is configured as a spring wire bent in a U-shape.

The activation region 8.3 is conceived in such a manner that the activation element 4 can be positioned at a plurality of locations of dissimilar height in the vertical direction z, and an activation of the activation element 4 nevertheless still unlocks the locking region 8.2, that is to say actuates the locking region 8.2 from the locked position VS to the unlocked position ES such that the headrest body 2 is freely movable, in particular displaceable in terms of height. By virtue of the assembled position of the activation element 4 relative to the activation region 8.3, which is freely selectable within limits, the locking element 8 can be used as a common part in different variants of headrests.

An end 8.3.1 of the activation region 8.3 that protrudes from the main support element 5 forms an upper height detent oH for an assembled position of the activation element 4 on the headrest body 2. The main support element 5, in particular a surface side 5.2, forms a lower height detent uH for an assembled position of the activation element 4 on the headrest body 2.

When the activation element 4 is released or not activated, the locking element 8 is actuated automatically, for example by the spring force of the spring wire in the activation region 8.3 and in the locking region 8.2, to the locked position on the main support element 5 such that the headrest body 2 is locked, thus held so as to be fixed on the support element 3 in the vertical direction z.

Figure 5:
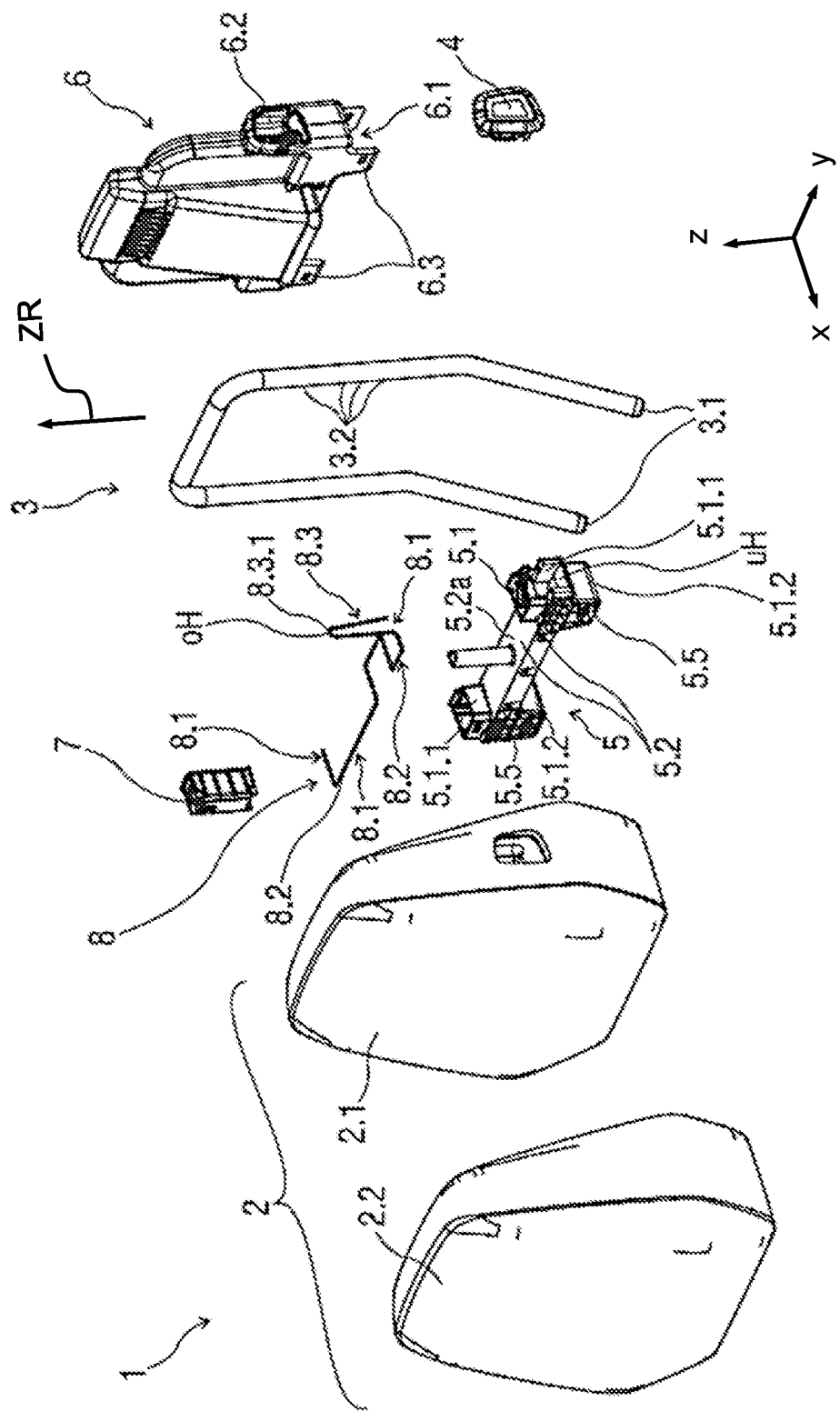
FIG. 5: shows an exploded view of a second embodiment of a headrest according to the invention.

FIG. 5 schematically shows an exploded illustration of a second embodiment of a headrest 1 according to the invention. The second embodiment of the headrest 1 differs in the number of bearings 7. Instead of two bearings 7, like the first exemplary embodiment as per FIG. 4, the main support element 5 of the second exemplary embodiment comprises only a single bearing 7.

Figure 6:
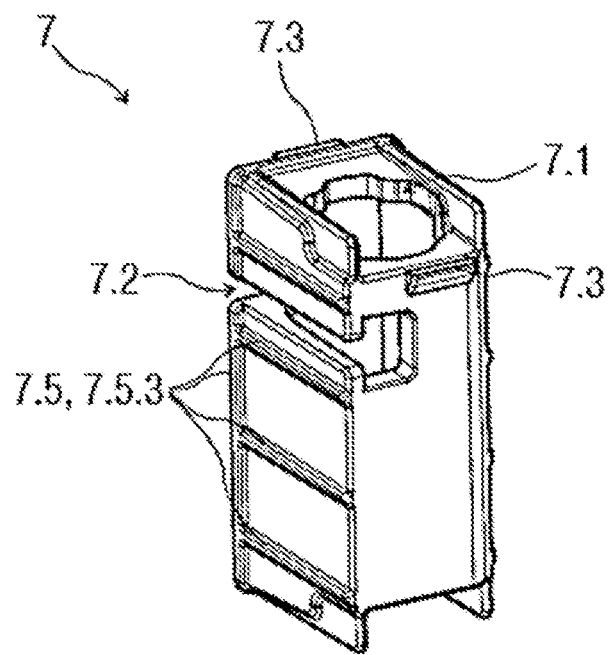
FIG. 6: shows a perspective view of a bearing, in particular of a friction bearing, for a headrest according to the invention.
Figure 7:
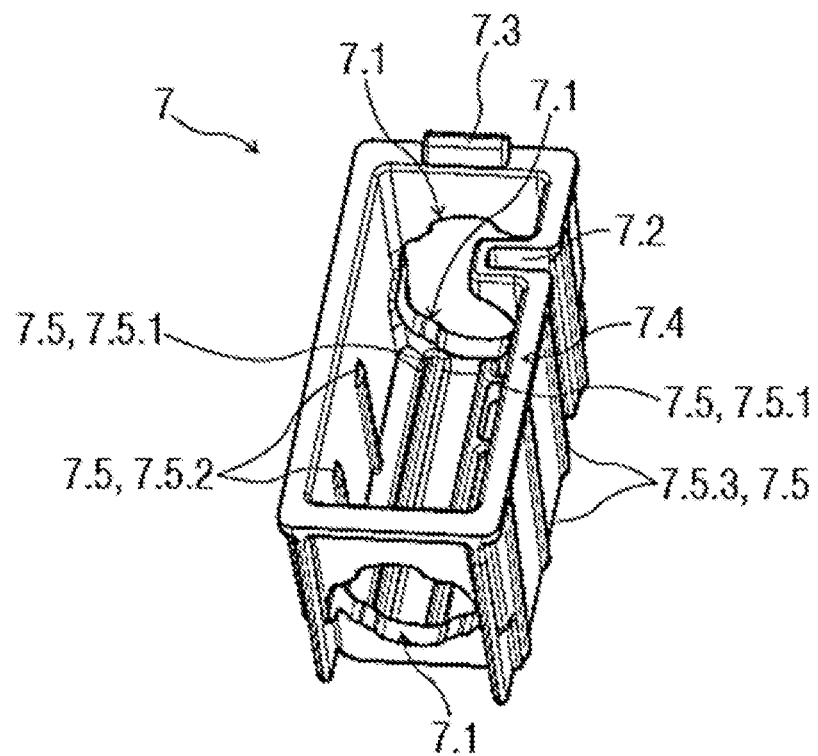
FIG. 7: shows a further perspective view of the bearing from FIG. 6.

FIGS. 6 and 7 in different perspective views schematically show an embodiment for the respective bearing 7 of the embodiments according to FIG. 4 and FIG. 5. The respective bearing 7 is configured as a friction bearing, in particular as a sliding sleeve.

The respective bearing 7 comprises an internal friction face 7.1 for receiving the support element 3 and for displaceably mounting the support element 3 in the bearing 7. The bearing 7 can have a round or angular cross section. Moreover, the bearing 7 comprises a recess 7.2 for receiving the locking element 8 in the locking position of the latter.

For fixing the bearing 7 in the main support element 5, in particular in the bearing opening 5.1, The bearing 7 comprises at least one fastening element 7.3, in particular a latching cam. The bearing 7 along the longitudinal extent thereof has at least one longitudinal opening 7.4. This longitudinal opening 7.4 serves in particular for receiving the support element 3, in particular a bent region of the support element 3, for example.

For the purpose of greater stability and strength and/or guidance, the bearing 7 can have ribs 7.5. The ribs 7.5 here can be provided on the inside as well as on the outside of the sleeve-shaped bearing 7, in particular be integrally molded thereon. The ribs 7.5 can be, for example, inner longitudinal ribs 7.5.1 which serve for guiding and sliding the headrest body 2 on the support element 3. Further ribs 7.5 can be configured as inner transverse ribs 7.5.2 which serve for increasing the stability and the strength of the bearing 7. Further ribs 7.5, which as outer ribs 7.5.3 run in the longitudinal and/or transverse extent of the bearing 7, serve in particular for increasing the stability and strength of the bearing 7 and/or for additionally fixing the bearing 7 in the main support element 5.

Figure 8:
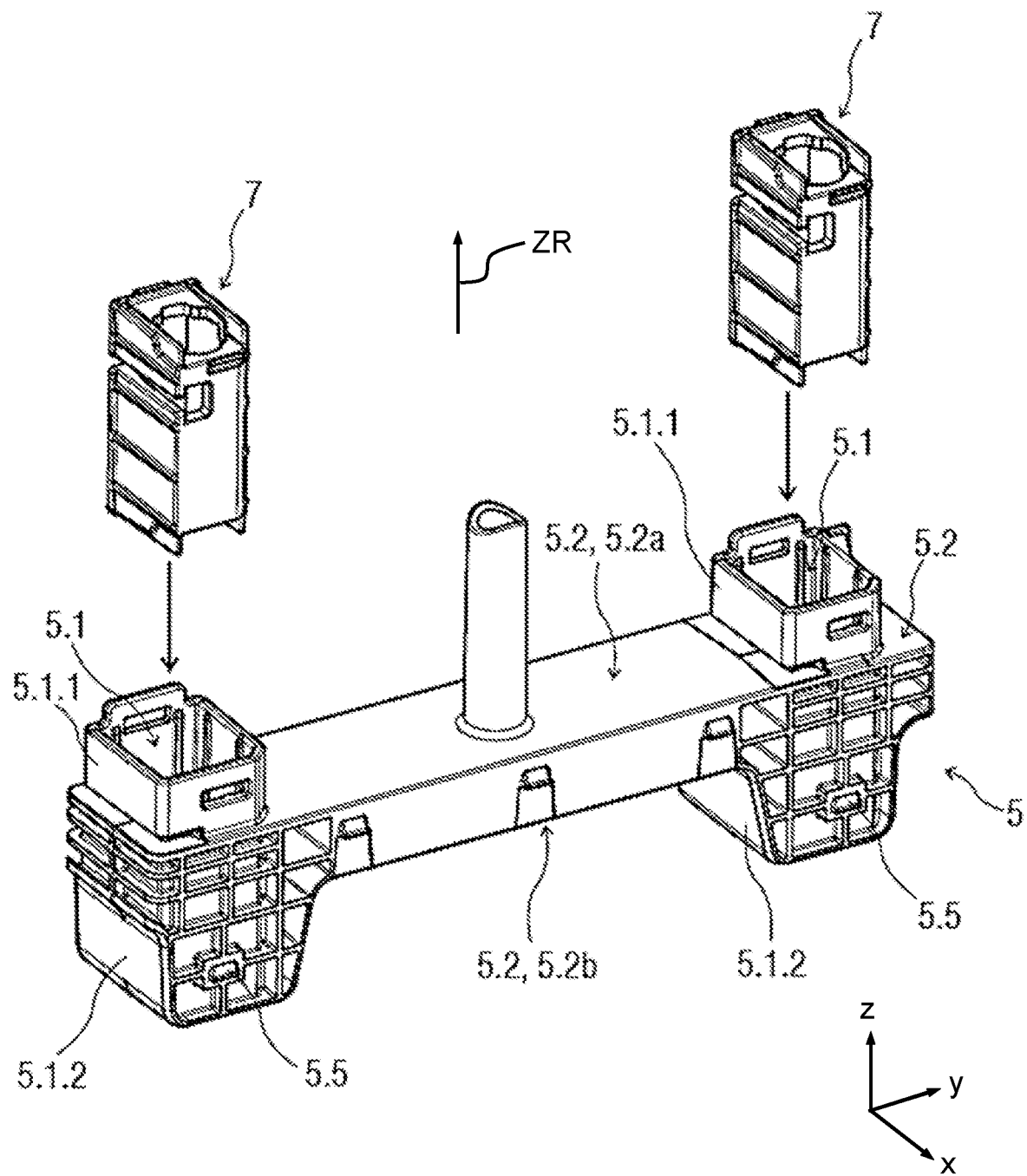
FIG. 8: shows an exploded illustration of a main support element and of two bearings of the first embodiment from FIG. 4.
Figure 9:
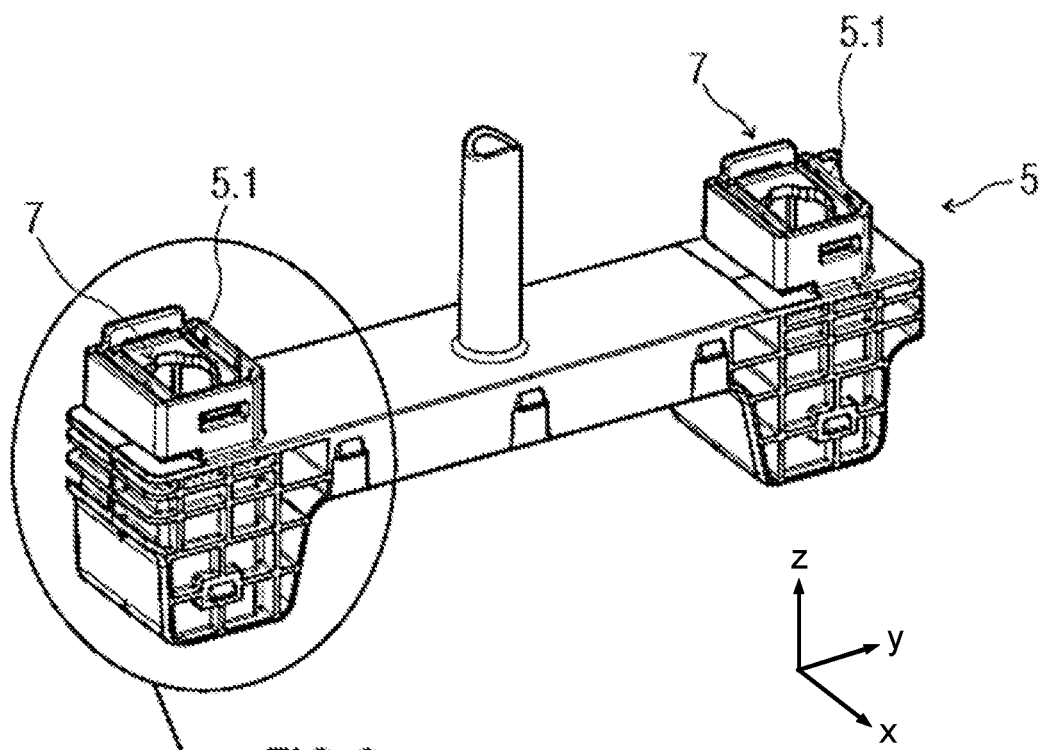
FIG. 9: shows a perspective view of the main support element and of the two bearings from FIG. 8, in an assembled state.
Figure 10:
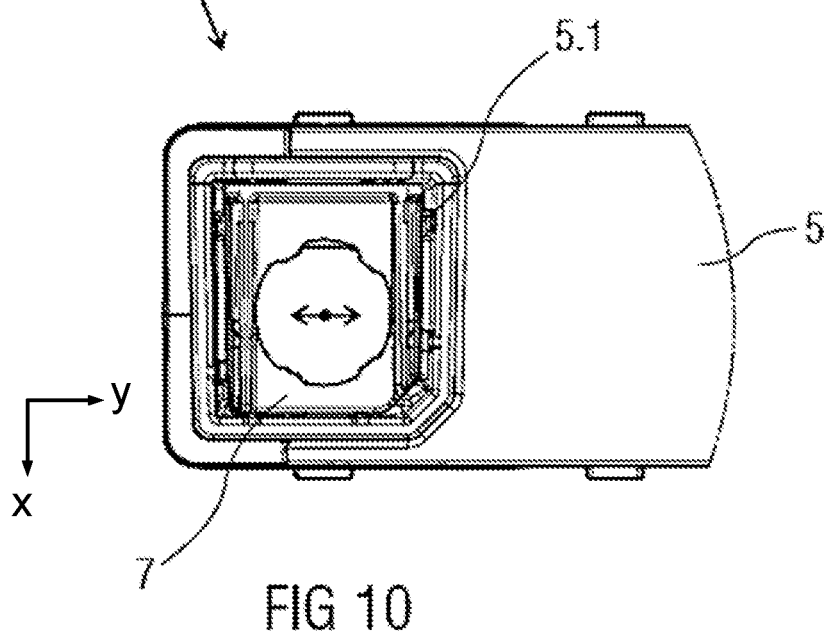
FIG. 10: shows fragments of a plan view from above of the main support element from FIG. 8 and of a bearing assembled therein.

FIGS. 8 to 10 schematically show different views of the first embodiment of the headrest 1 having two bearings 7. The two bearings 7 here, in terms of shape, size and dimensions, are of identical configuration. FIG. 8 shows the assembly of the bearings 7 in the bearing openings 5.1 of the main support element 5. FIG. 9 shows the bearings 7 assembled in the main support element 5 in a perspective view. FIG. 10 shows the bearings 7 assembled in the main support element 5 in a plan view from above.

Figure 11:
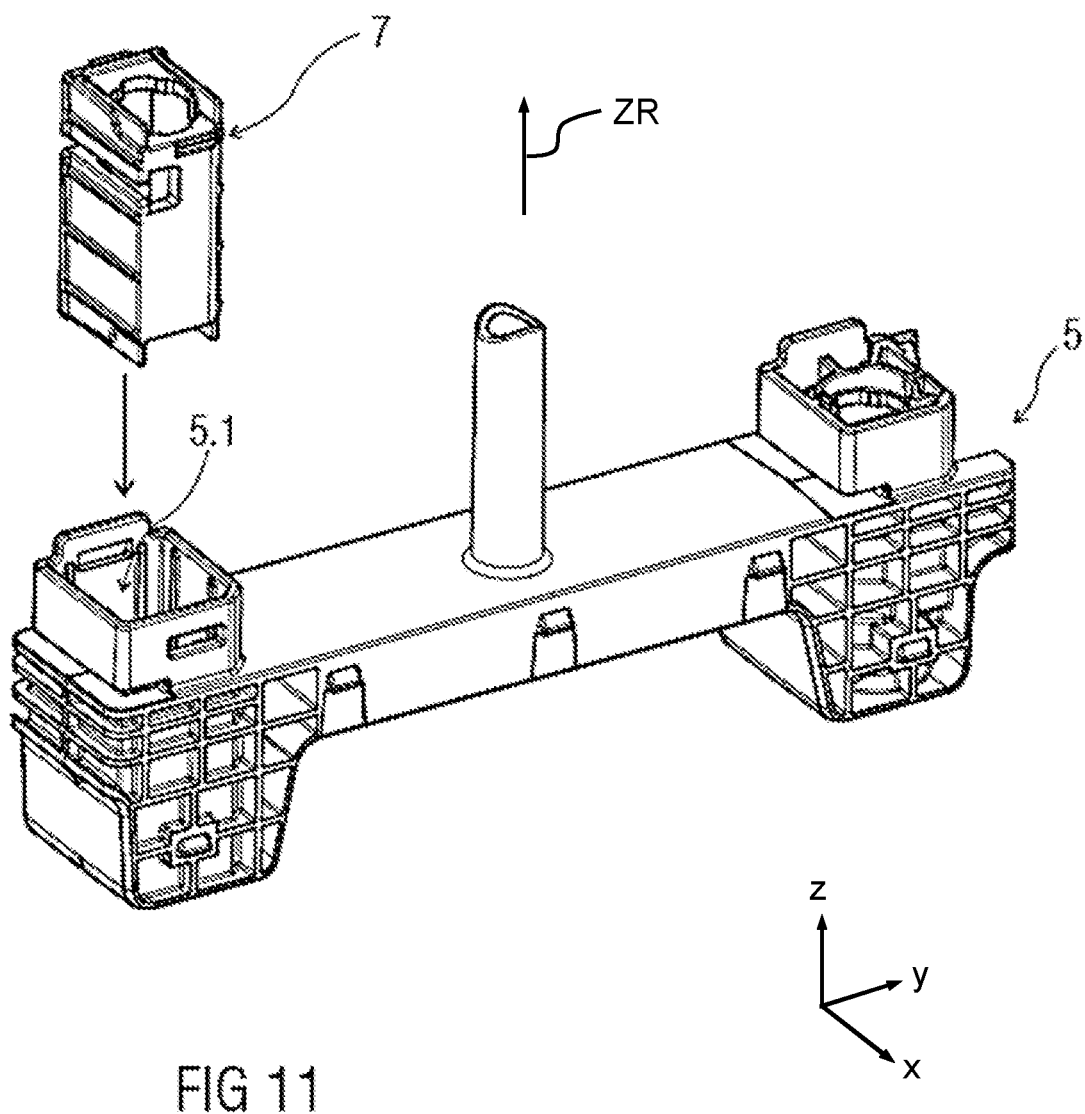
FIG. 11: shows an exploded illustration of a main support element and of two bearings of the second embodiment from FIG. 5.
Figure 12:
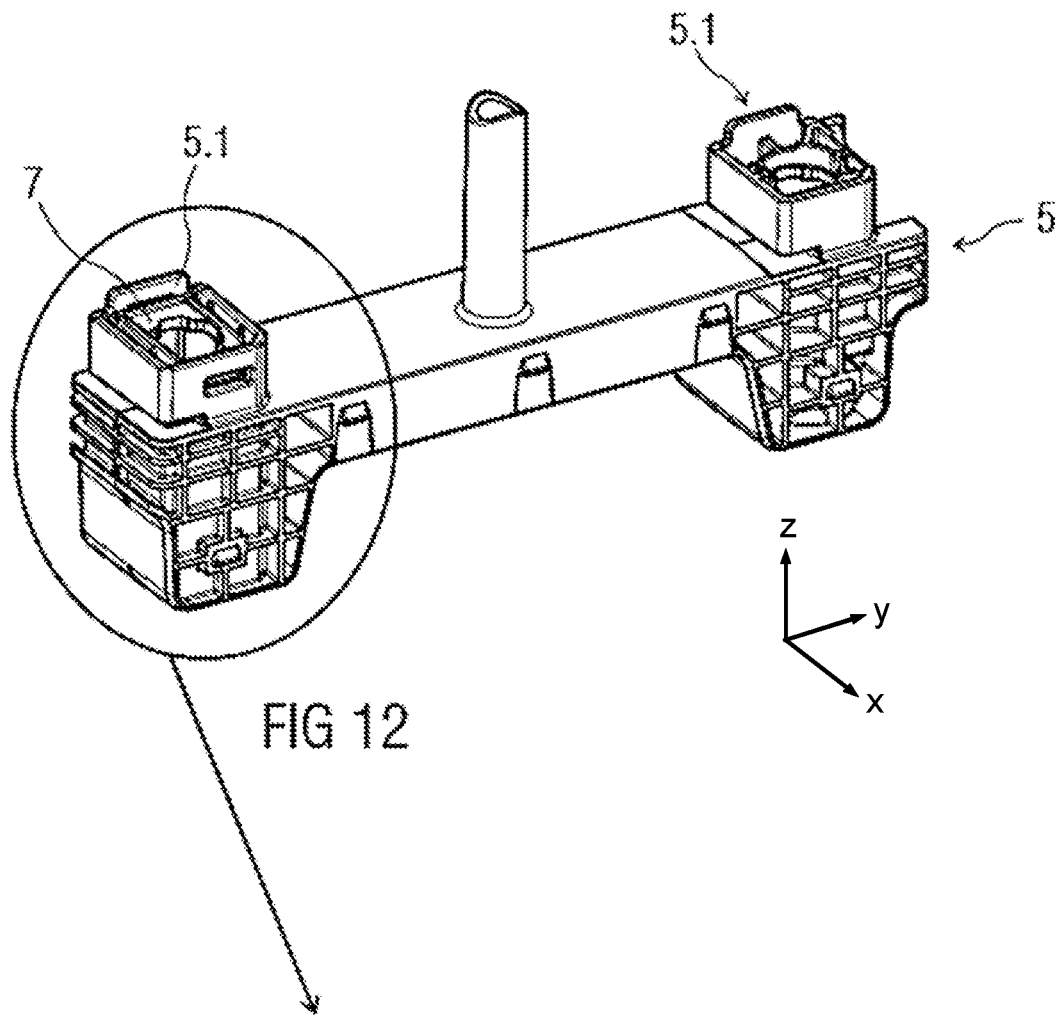
FIG. 12: shows a perspective view of the main support element and of the two bearings from FIG. 11, in an assembled state.
Figure 13:
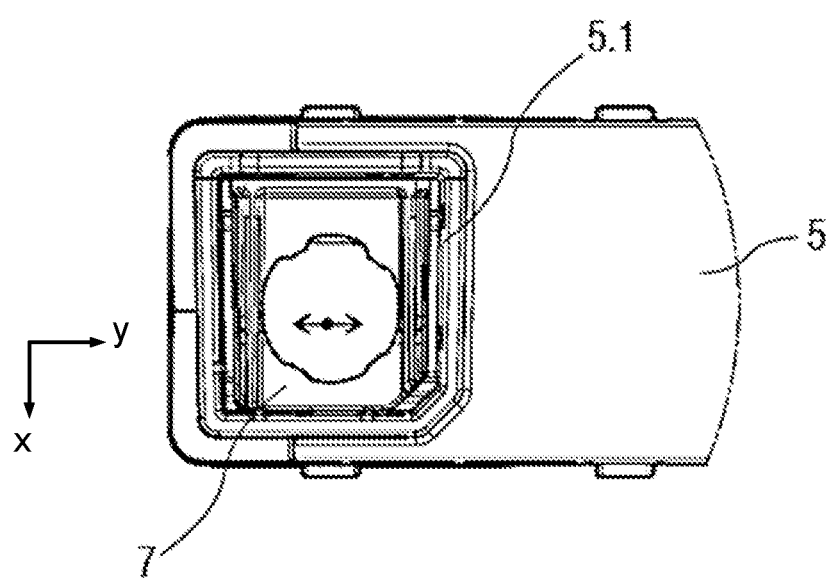
FIG. 13: shows fragments of a plan view from above of the main support element from FIG. 8 and of a bearing assembled therein.

FIGS. 11 to 13 schematically show different views of the second embodiment of the headrest 1 having a single bearing 7. FIG. 11 shows the assembly of the bearing 7 in one of the bearing openings 5.1 of the main support element 5. FIG. 12 shows the bearing 7 assembled in the main support element 5 in a perspective view. FIG. 13 shows the bearing 7 assembled in the main support element 5 in a plan view from above. The main support element 5 and the bearing 7 of the second exemplary embodiment, in terms of shape, size and dimensions, can be configured so as to be identical to the main support element 5 and to the bearings 7 of the first exemplary embodiment.

Figure 14:
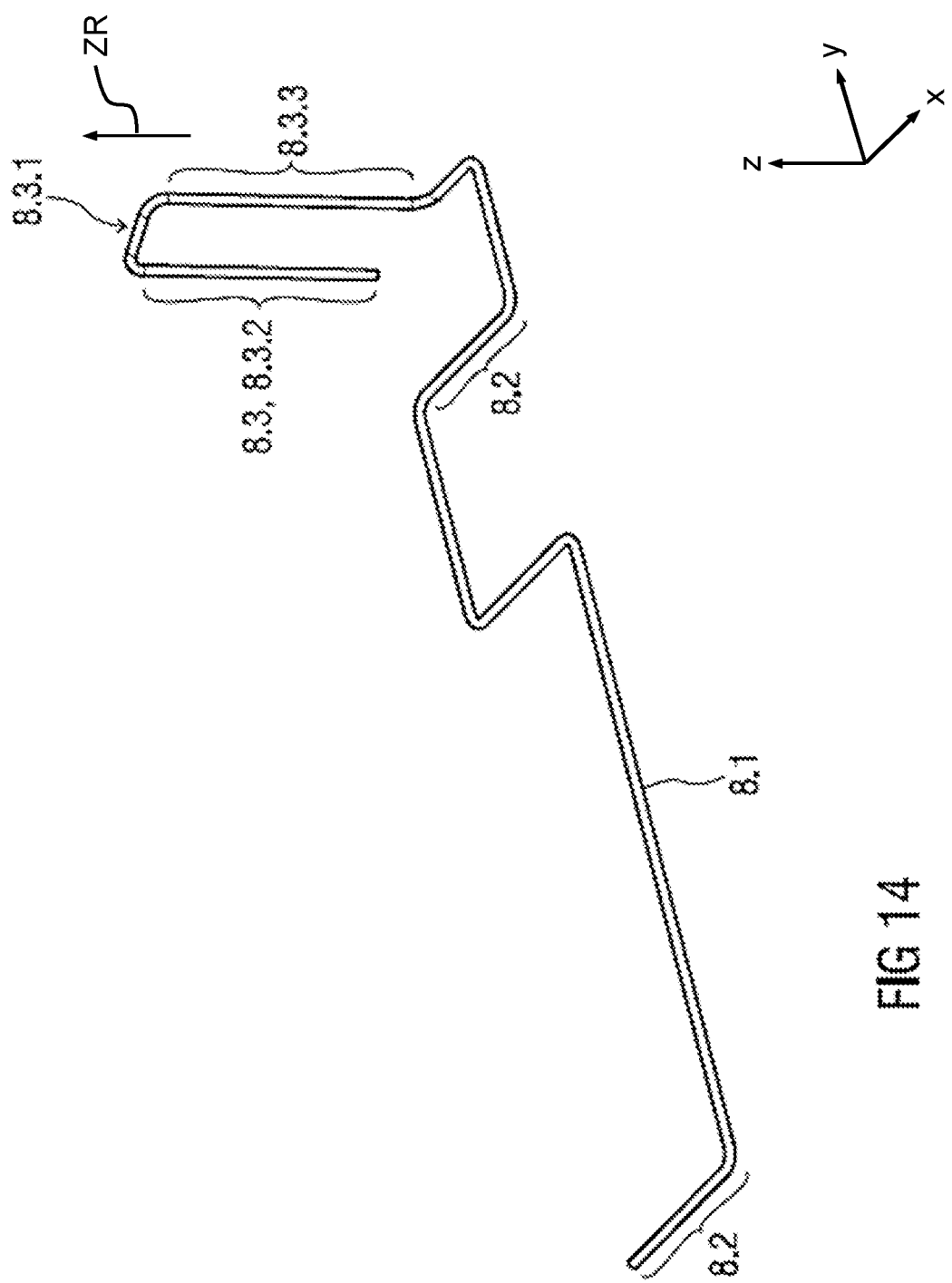
FIG. 14: shows a perspective view of a locking element of a headrest according to the invention.

FIG. 14 shows an embodiment for the locking element 8. This locking element 8 can be used in the first embodiment of the headrest 1 (illustrated in FIG. 3) as well as in the second embodiment of the headrest 1 (illustrated in FIG. 4). The locking element 8 is configured as a spring wire and comprises the fastening region 8.1, at least one locking region, in the example two locking regions 8.2, and the activation region 8.3. The respective regions are formed by correspondingly bent wire regions. The fastening region 8.1 and the locking regions 8.2 here can be configured in a correspondingly stronger manner than the activation region 8.3, the latter being configured so as to be in particular flexible, for example resilient.

Moreover, the activation region 8.3 can be subdivided into a flexible region 8.3.2 and an engagement region 8.3.3 for the activation element 4. The end 8.3.1 of the activation region 8.3 connects the flexible region 8.3.2 and the engagement region 8.3.3 to one another. The flexible region 8.3.2 and the engagement region 8.3.3 in a non-activated state of the activation element 4 run so as to be spaced apart and largely mutually parallel. The flexible region 8.3.2 and the engagement region 8.3.3 preferably run in each case largely parallel to the vertical direction z. The end 8.3.1 of the activation region 8.3 preferably runs largely in a plane which runs perpendicular to the vertical direction z. The end 8.3.1 of the activation region 8.3 preferably runs obliquely to the longitudinal direction x, in a non-activated state of the activation element 4 runs in particular obliquely so as to be at an angle of approximately 45 degrees in relation to the longitudinal direction x.

The locking element 8 is integrally configured and by way of the different regions thereof is configured as a multifunction element having a combined fastening, locking, spring and activation function integrated therein.

The activation region 8.3 is configured in such a manner that different headrest bodies 2 having an activation element 4 positioned at dissimilar heights relative to each other can be disposed on the main support element 5. The resultant disposal of the activation element 4 in the vertical direction z relative to the main support element 5, and thus relative to the activation region 8.3, is freely selectable within limits that are defined in particular by the length of the activation region 8.3.

Figure 15:
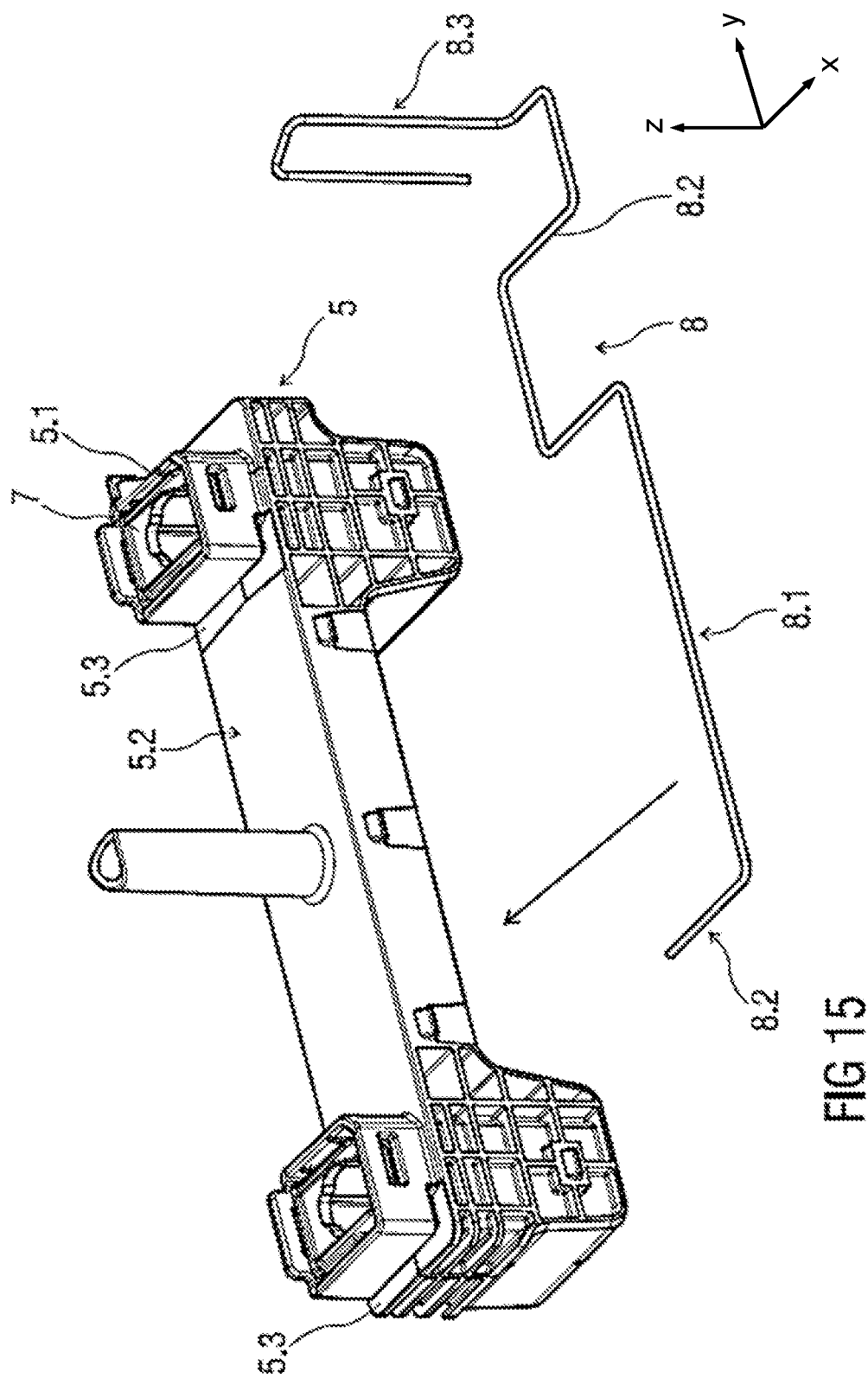
FIG. 15: shows a view corresponding to that of FIG. 9, in which the locking element from FIG. 14 is added, prior to being assembled to the main support element from FIG. 8.
Figure 16:
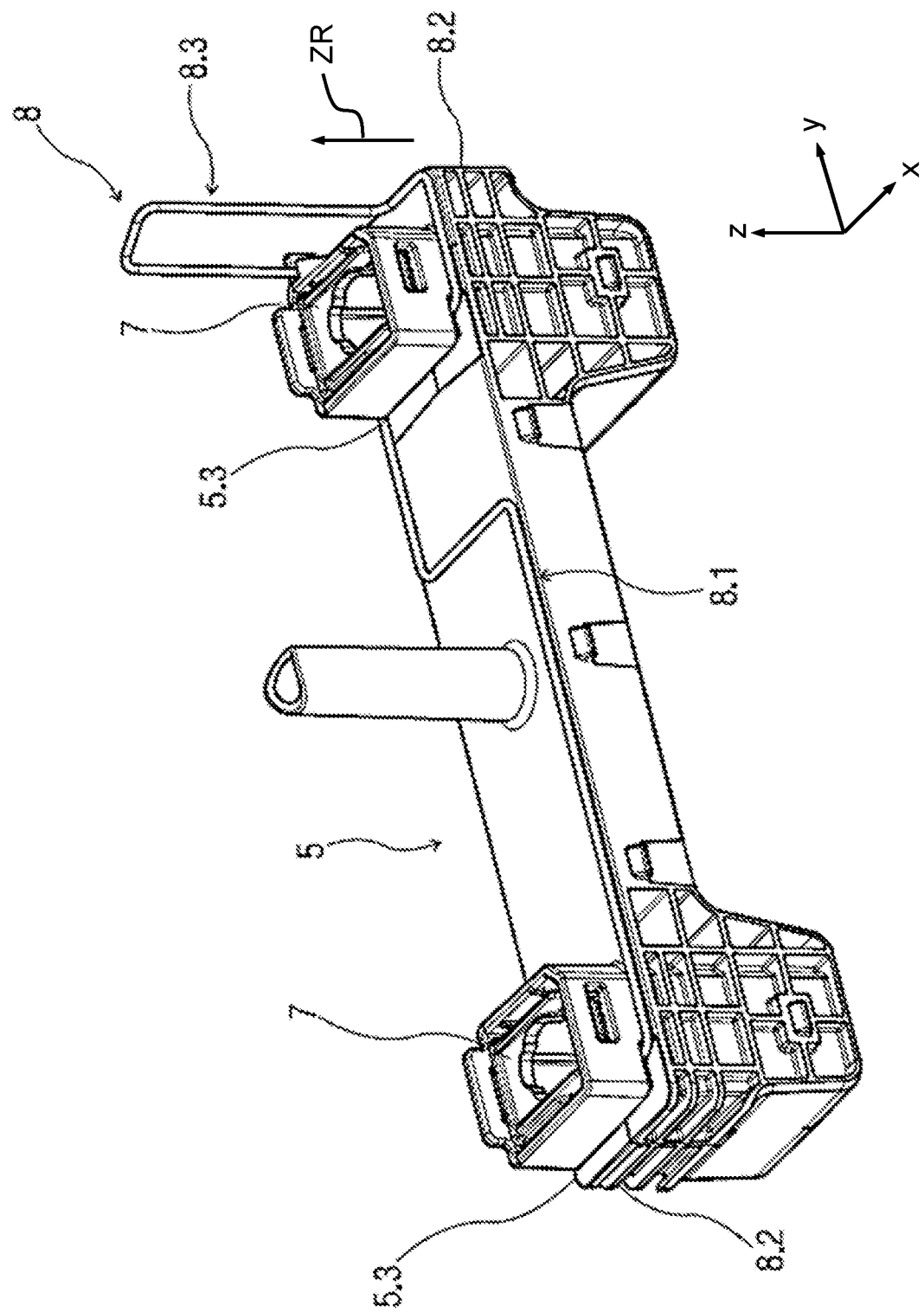
FIG. 16: shows a view corresponding to that of FIG. 15, wherein the locking element is illustrated when assembled on the main support element.

FIGS. 15 to 18B schematically show different views of the locking element 8 fastened to the main support element 5. FIG. 15 shows the assembly of the locking element 8 on the main support element 5. In the locked state of the headrest 1, each of the two locking regions 8.2 is disposed in each case in one of two corresponding openings 5.3, in particular slot-shaped clearances, of the main support element 5. FIG. 16 shows the locking element 8 assembled on the main support element 5 in a perspective view.

Figure 17:
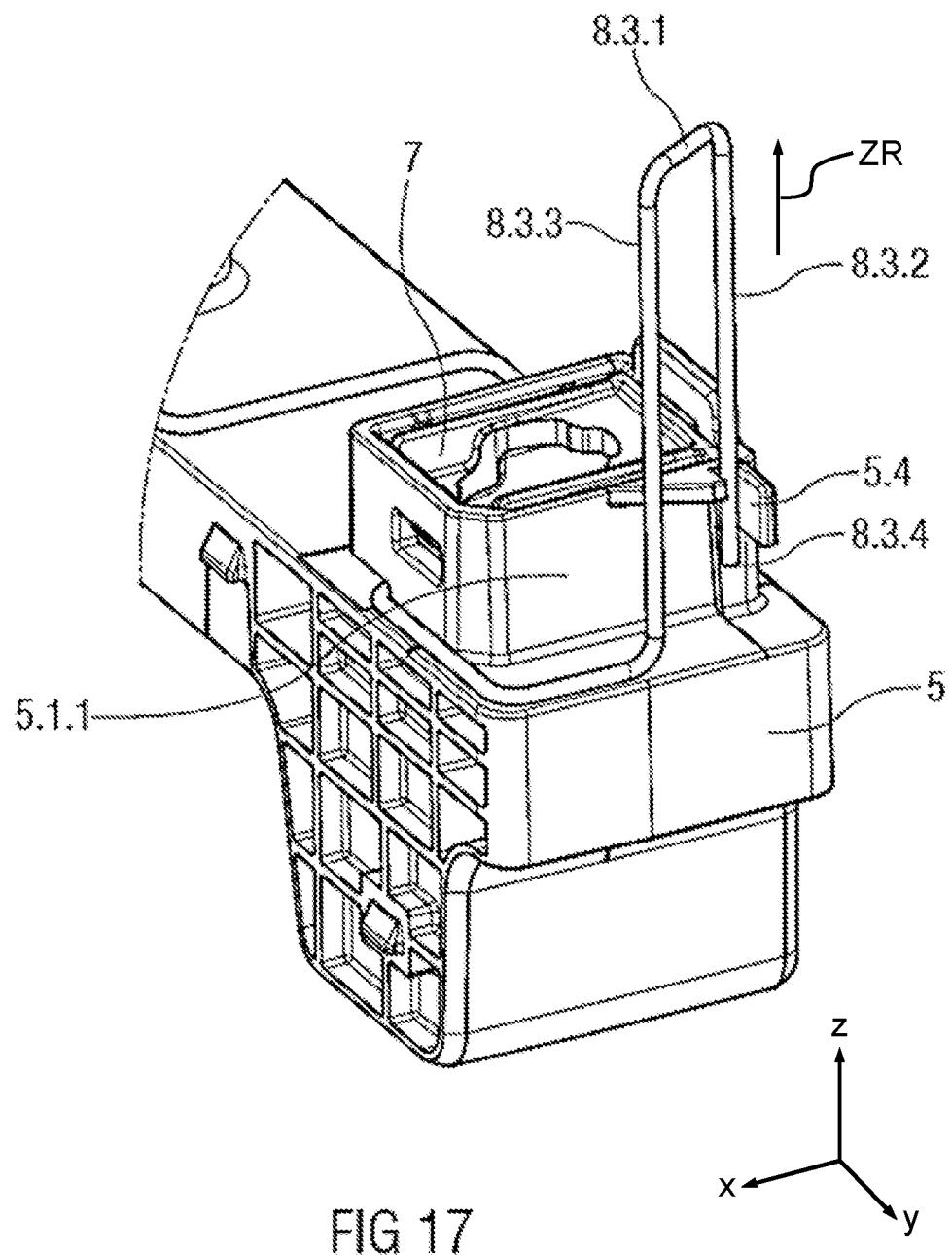
FIG. 17: shows fragments of a further perspective view onto the locking element from FIG. 14, assembled on the main support element from FIG. 8.

FIG. 17 shows the fastening of the locking element 8 to the main support element 5 in an enlarged illustration.

A free fastening end 8.3.4 of the locking element 8 is fixed in a form-fitting and force-fitting manner in a fastening groove 5.4 of the main support element 5, and forms a sub-region of the fastening region 8.1.

Figure 18A:
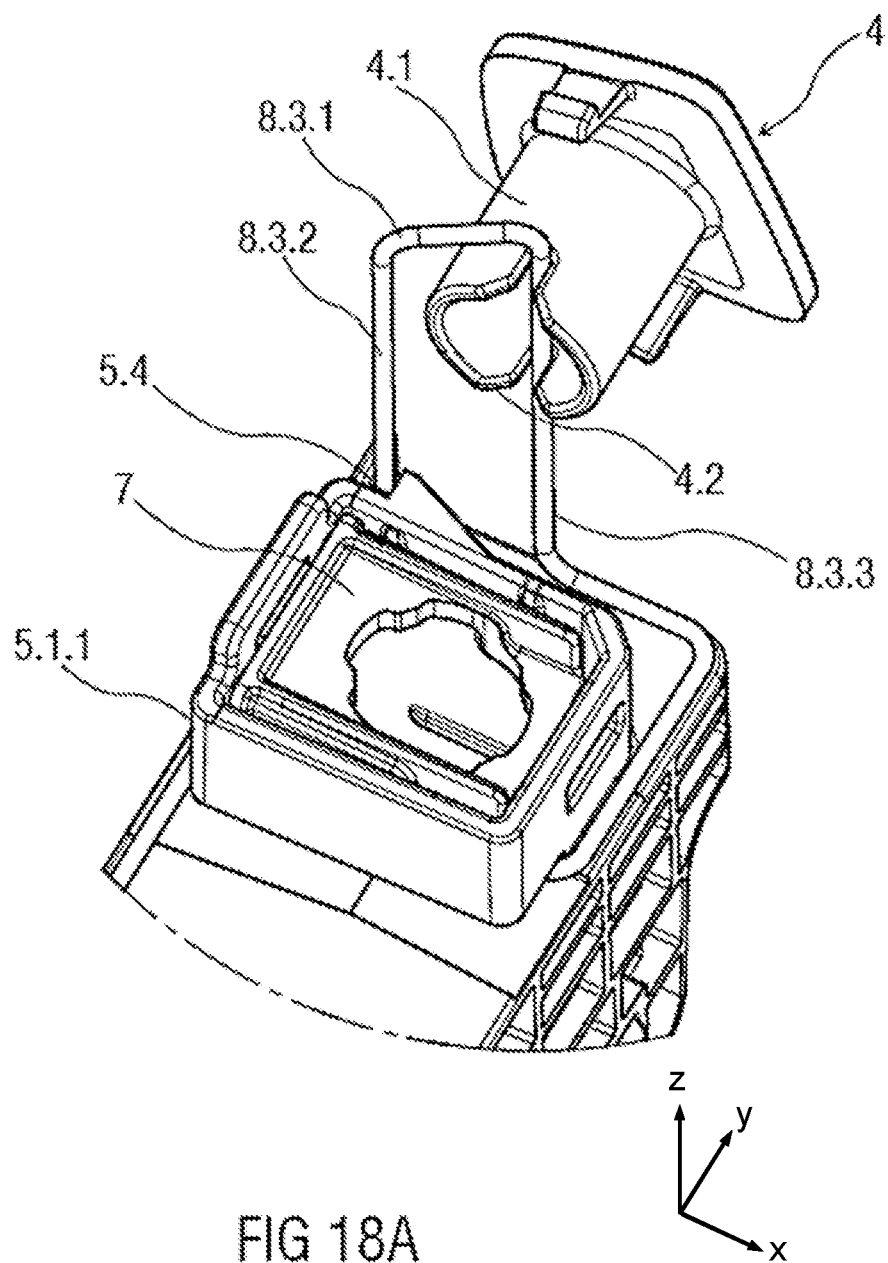
FIG. 18A: shows fragments of a perspective view onto the main support element from FIG. 8, the locking element from FIG. 14, and an activation element for activating the locking element.
Figure 18B:
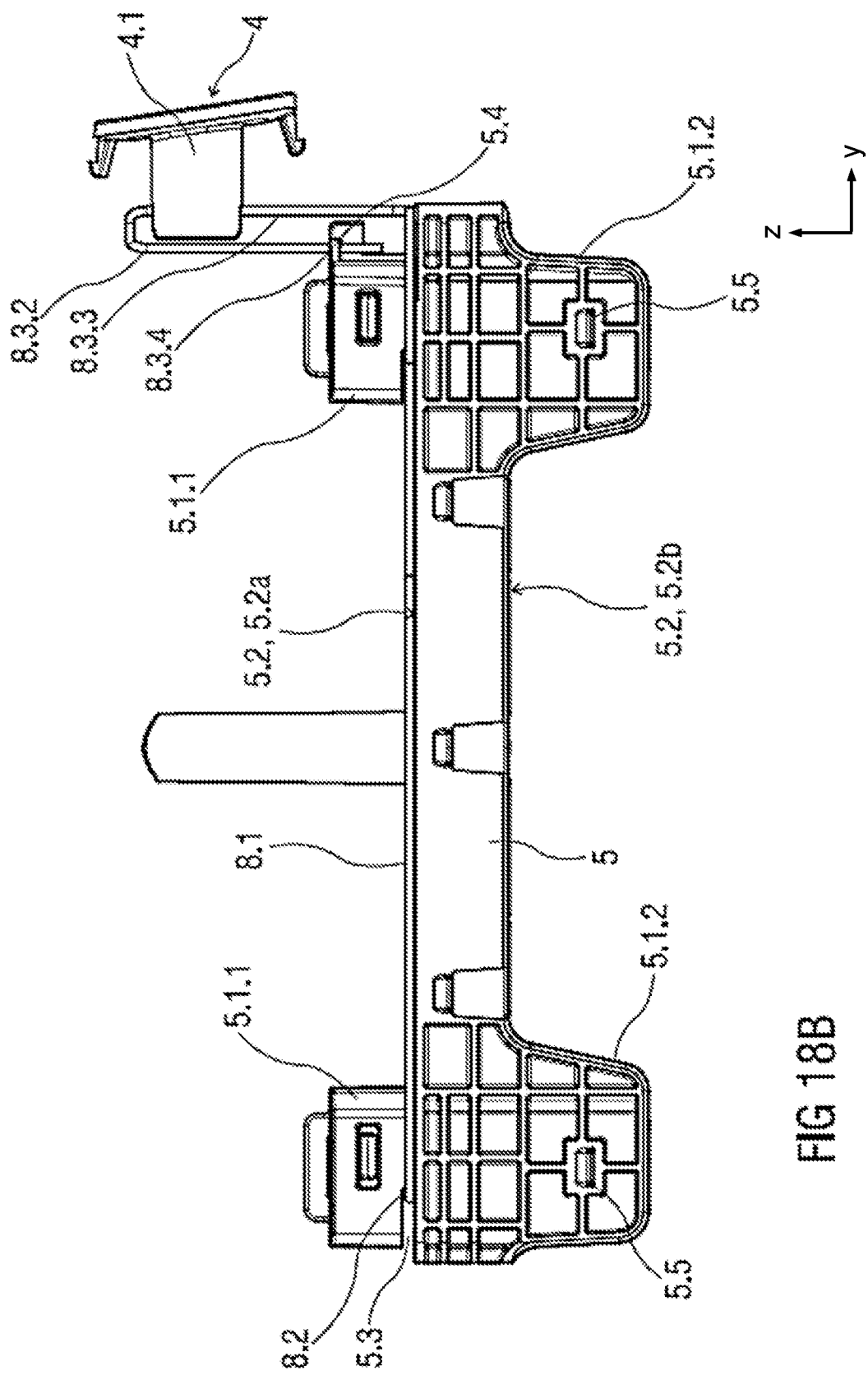
FIG. 18B: shows a front view of the assembly from FIG. 18A, wherein the activation element is in a non-activated state.

FIGS. 18A and 18B show the activation element 4 in the non-activated position thereof, that is to say in the initial position thereof, in which the activation element 4 bears on the activation region 8.3, in particular on the engagement region 8.3.3, but is not in an activation engagement. The activation element 4 comprises a coupling region 4.1 which is coupled to the engagement region 8.3.3. The coupling region 4.1 is configured so as to correspond to the engagement region 8.3.3 of the locking element 8.3. The engagement region 8.3.3 is configured in the shape of a wire. The coupling region 4.1 is configured as a holding recess 4.2, in particular a holding slot or a holding groove, for receiving the engagement region 8.3.3.

Figure 19:
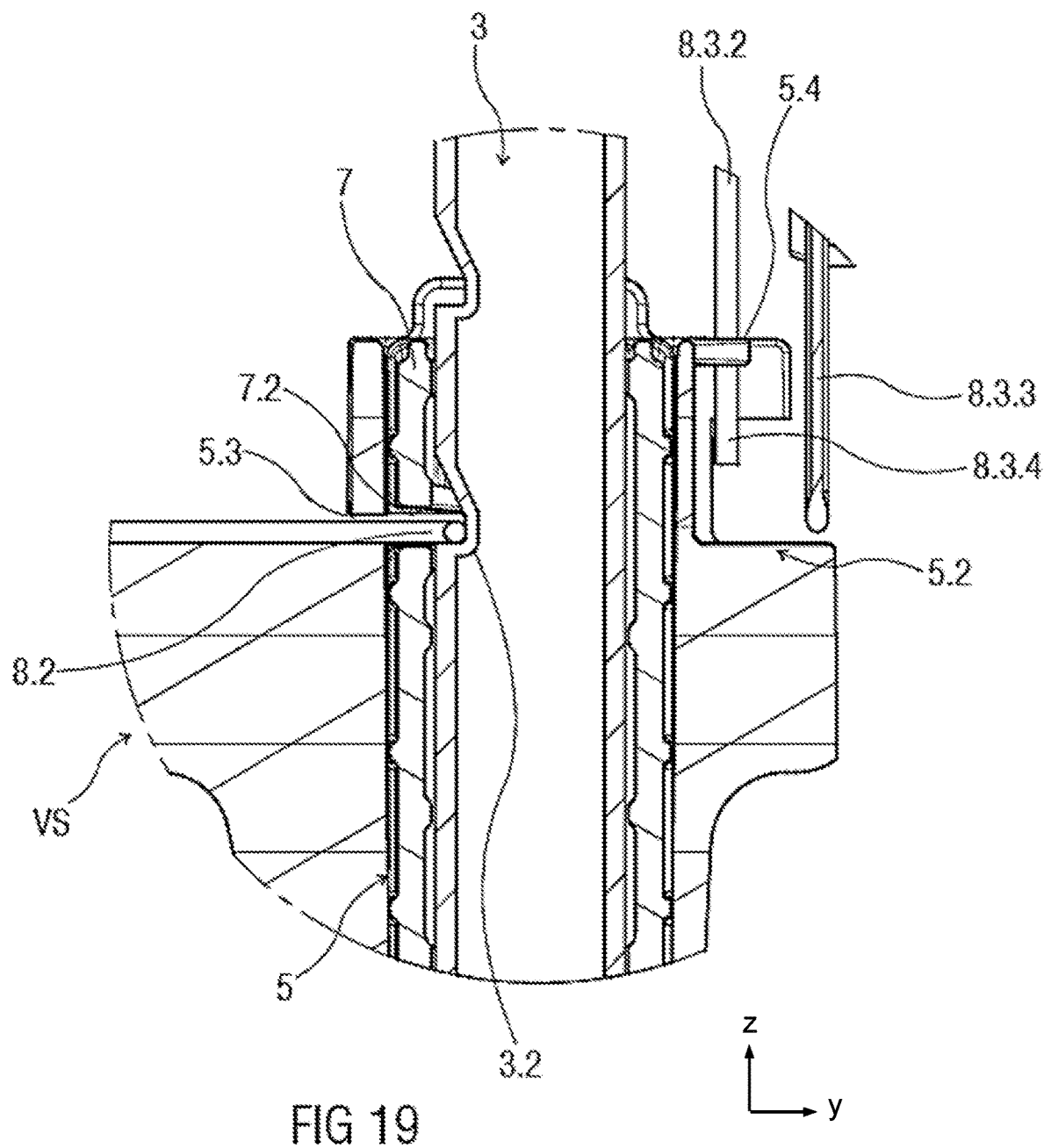
FIG. 19: shows a section through a locking region of the assembly from FIG. 18A, wherein the activation element is in a non-activated state and the locking element is in a position locking a support element.

FIG. 19 schematically shows an enlarged view of a partially opened main support element 5 in the locking region 8 2, with the locking element 8 in the locked position VS thereof in which the headrest body 2 is secured on the support element 3. The locking region 8.2 in the locked position VS engages in a form-fitting and force-fitting manner with the form-fitting means and force-fitting means 3.2. The form-fitting means and force-fitting means 3.2 is embodied, for example, as a machined notch having a sharp shoulder and a beveled face. The beveled face enables the locking region 8.2 to be easily introduced into the notch and secured therein without canting.

Figure 20:
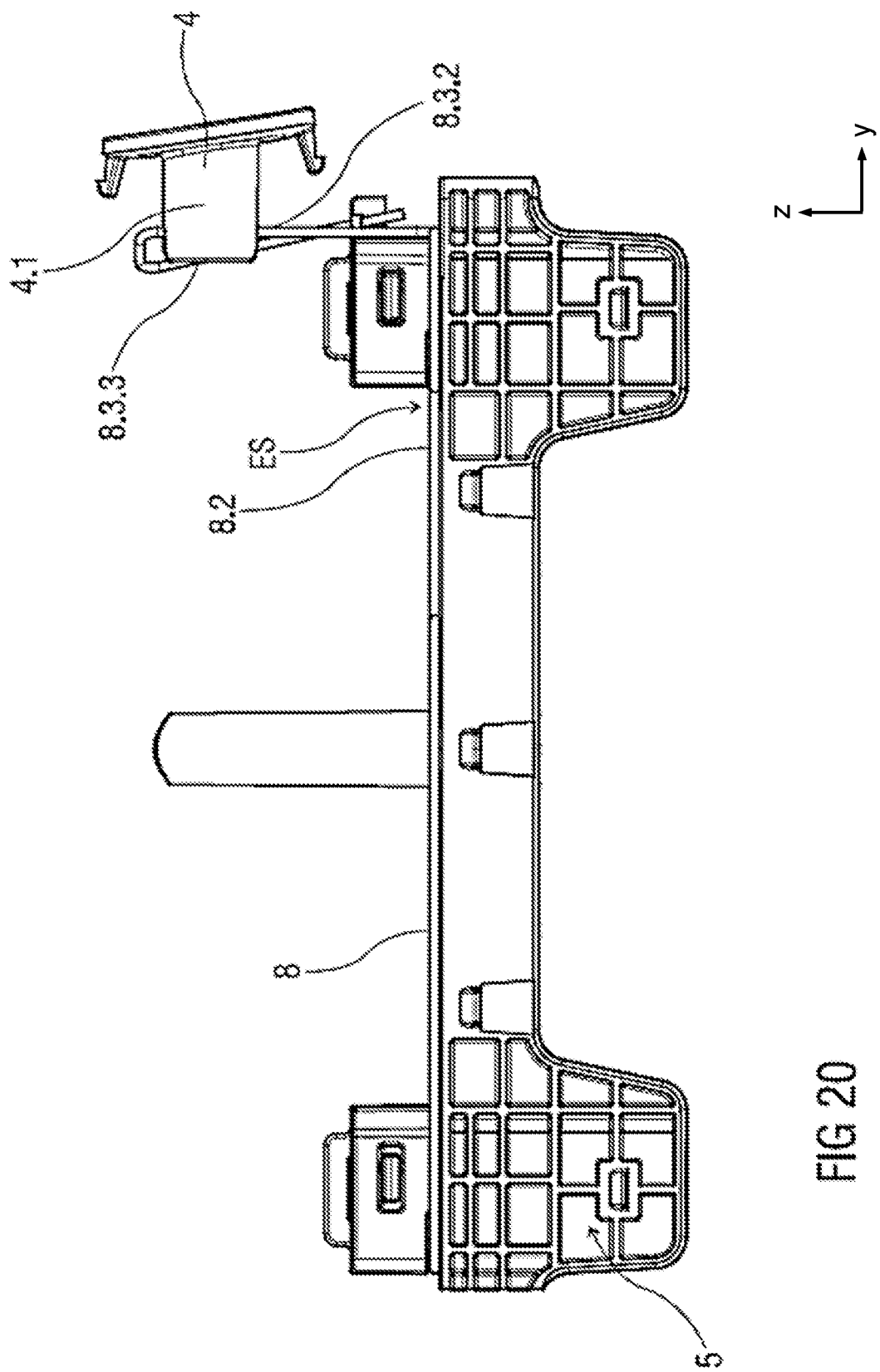
FIG. 20: shows a front view of the assembly from FIG. 18A, wherein the activation element is in an activated state and the locking element is in an unlocked position.

FIG. 20 in a schematic view shows the activation element 4 in an activated state, that is to say in an unlocking interaction, in particular engagement, with the locking element 8. The activation element 4 pushes against the engagement region 8.3.3, as a result of which the locking region 8.2 is forcibly moved from the locked position VS thereof to the unlocked position ES. The fastening end 8.3.4 is fixed in the fastening groove 5.4.

Figure 21:
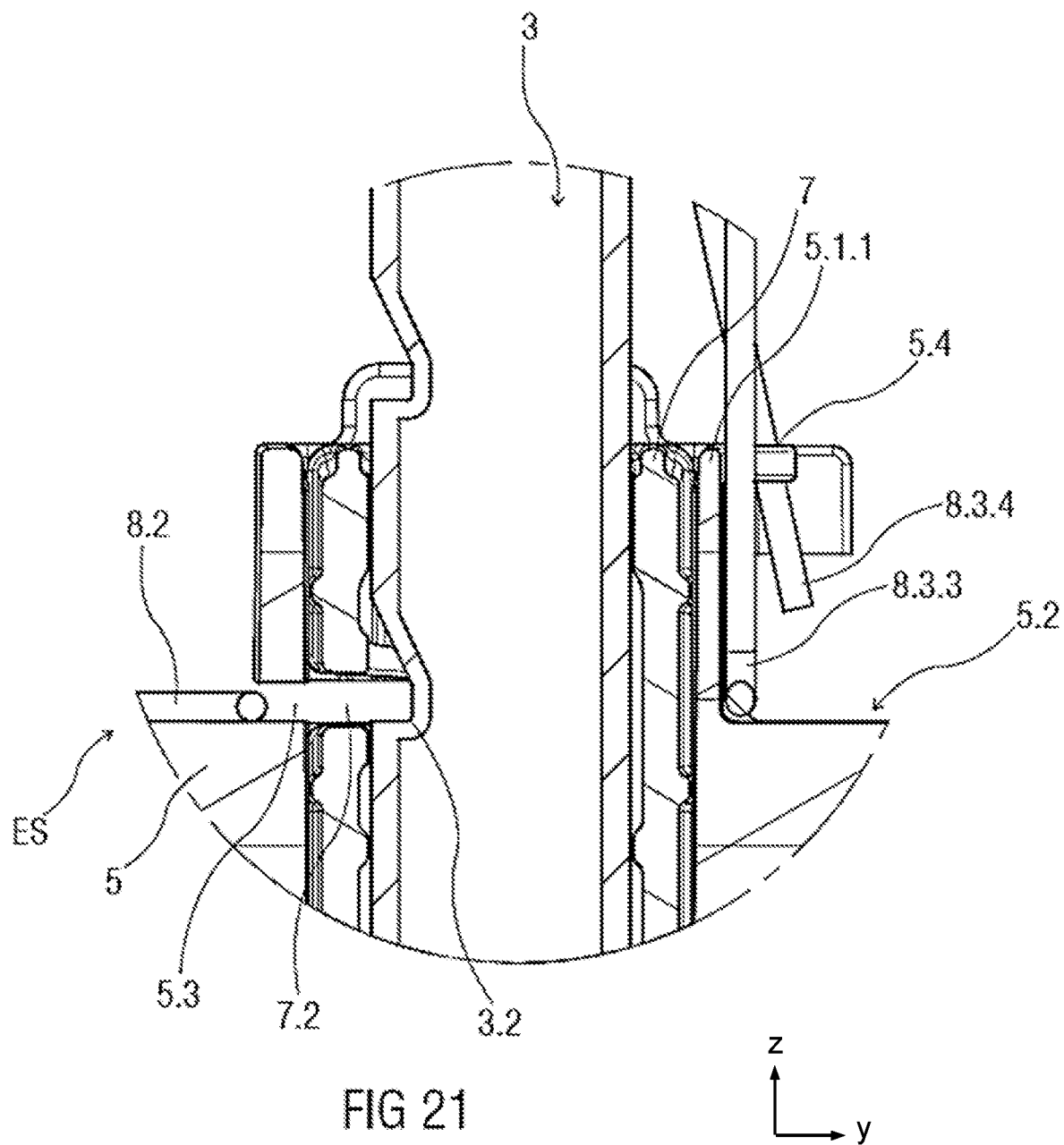
FIG. 21: shows a section corresponding to FIG. 19, wherein the activation element is in an activated state and the locking element is in an unlocked position.

FIG. 21 shows the locking element 8 in the unlocked position ES thereof. The activation of the activation element 4, and consequently the movement of the locking element 8 to the unlocked position ES, is delimited by the external contour of the upper appendage 5.1.1 on which the coupling region 4.1 of the activation element 4 impacts.

In this unlocked position ES, the locking region 8.2 has been moved out of the form-fitting means and force-fitting means 3.2, out of the recess 7.2 and out of the slot-shaped opening 5.3, and thus moved out of the secured engagement on the support element 3, such that the headrest body 2 and the components fixedly connected thereto, such as the main support element 5, the bearing 7, the locking element 8, the activation element 4, are movable up and down relative to the support element 3, and the headrest body 2 is thus adjustable to one of the height positions HP.

Figure 22:
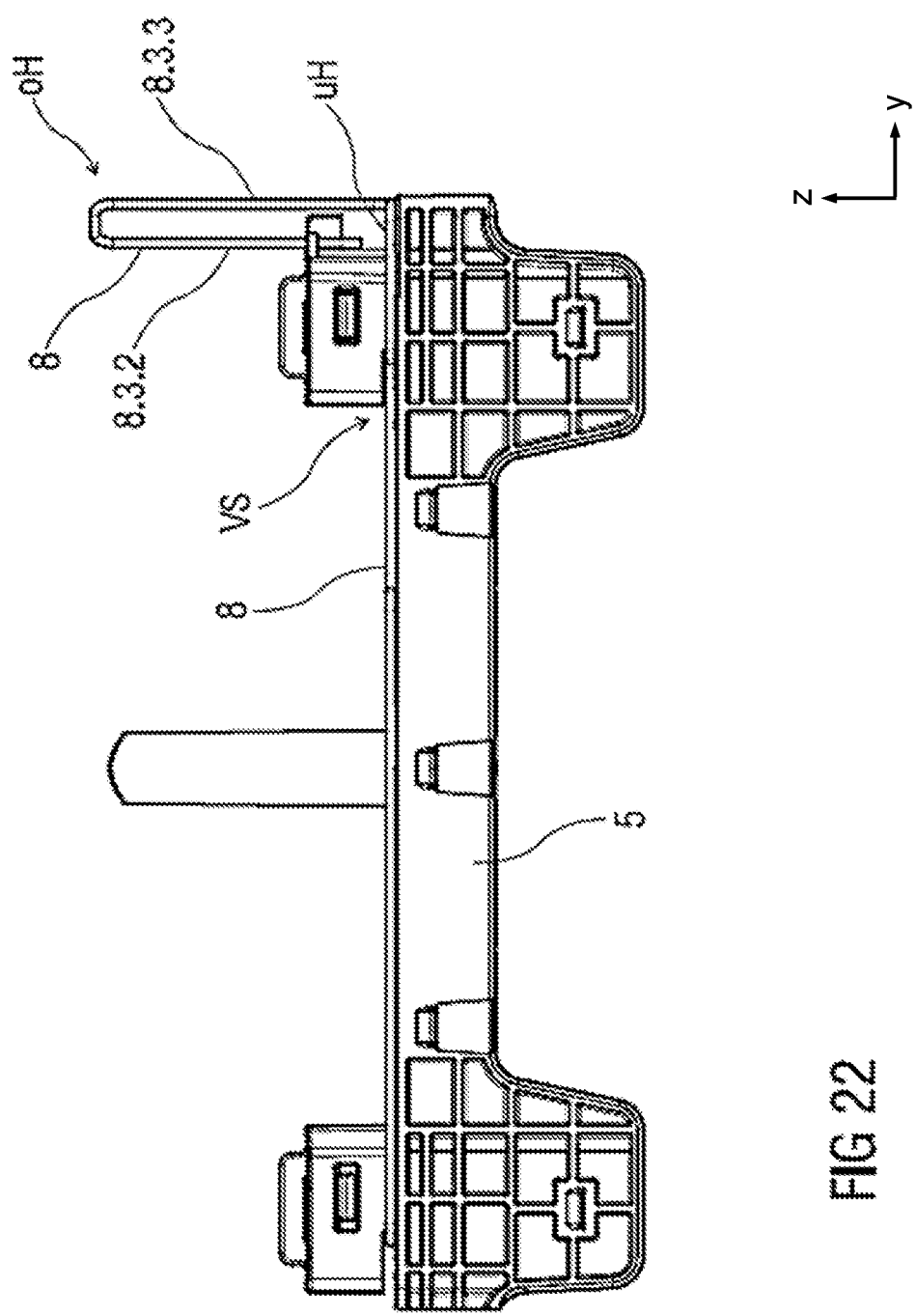
FIG. 22: shows a front view of the main support element from FIG. 8, having the locking element from FIG. 14 fastened thereto.

FIG. 22 in a schematic view shows the main support element 5, with the fastened locking element 8 in the locked position VS, without the activation element 4.

Figure 23A:
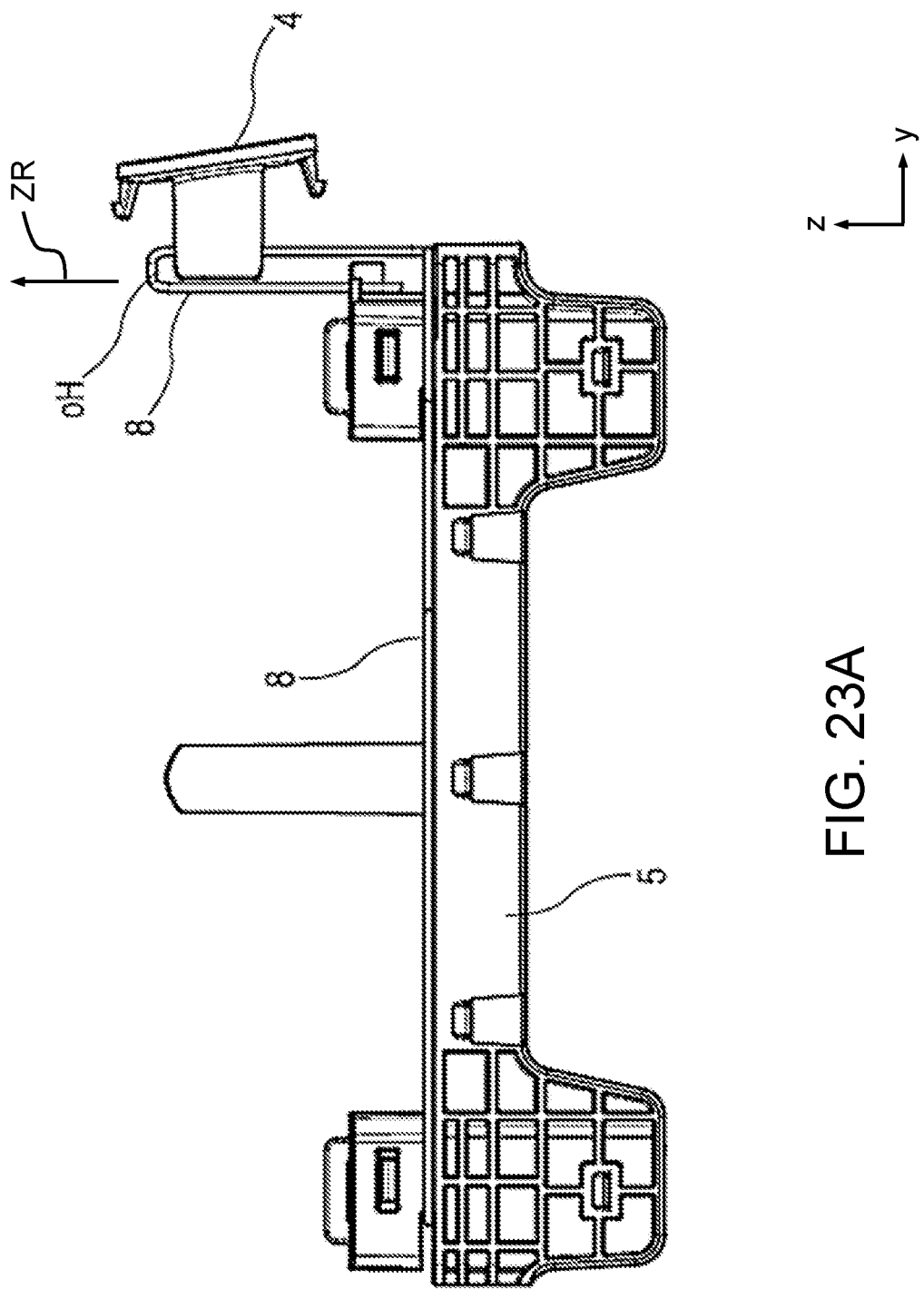
FIG. 23A: shows a front view of the main support element from FIG. 8, having the locking element from FIG. 14 fastened thereto, and an activation element in an upper assembled position.
Figure 23B:
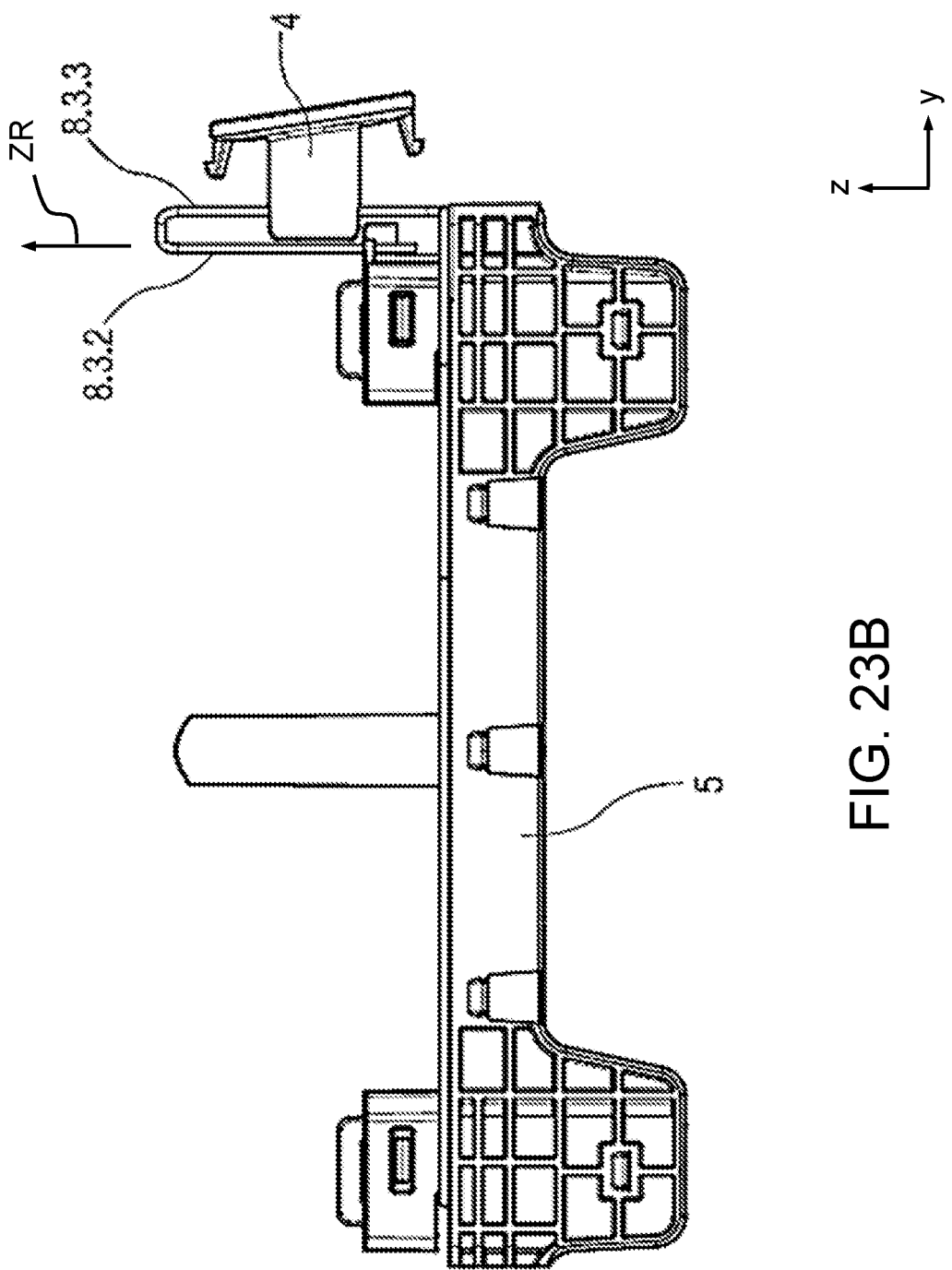
FIG. 23B: shows a view corresponding to that of FIG. 23A, wherein the activation element is disposed in a central assembled position.
Figure 23C:
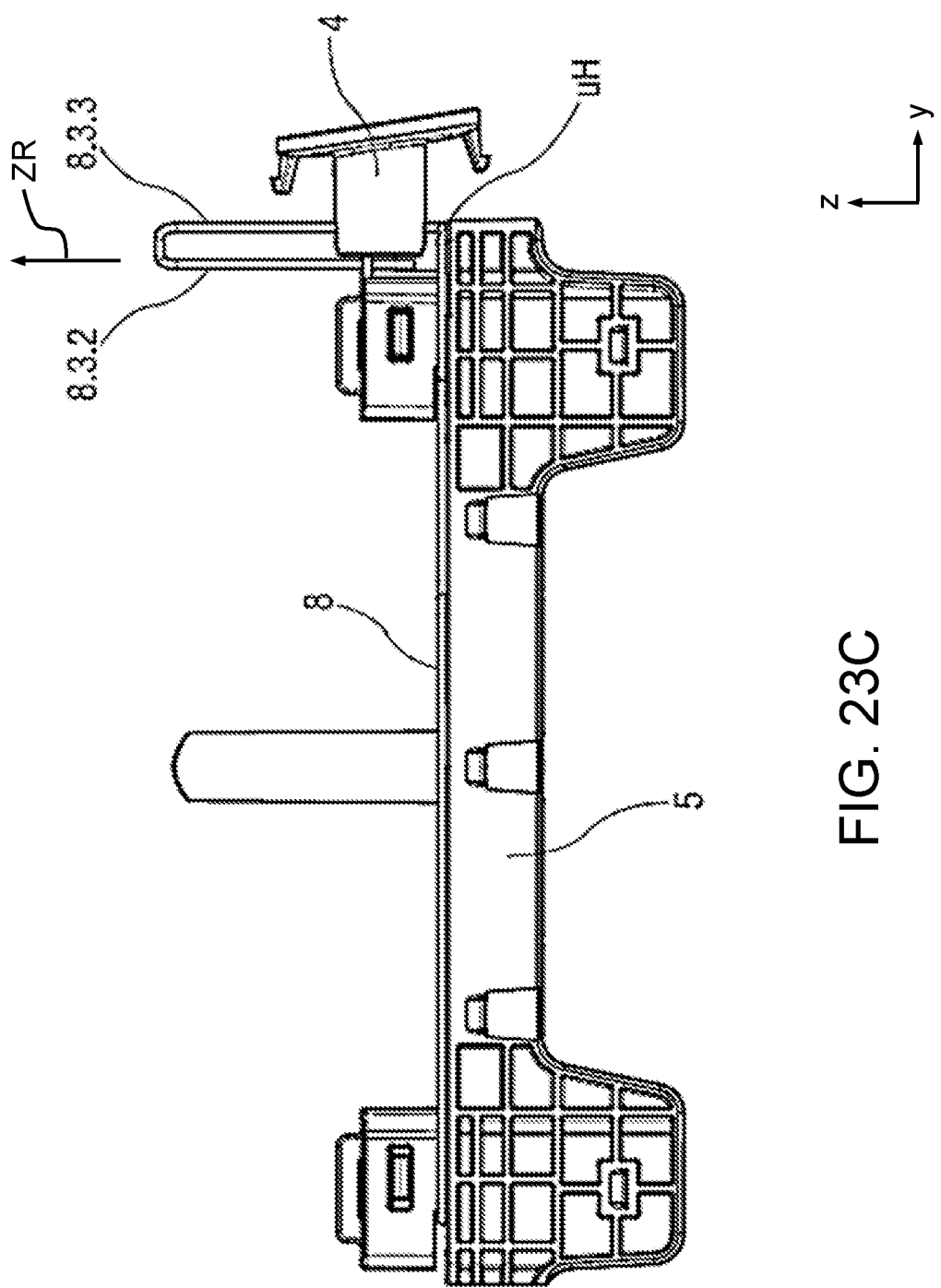
FIG. 23C: shows a view corresponding to that of FIG. 23A, wherein the activation element is disposed in a lower assembled position.

FIGS. 23A to 23C in a schematic view show the main support element 5 having the fastened locking element 8 and having the activation element 4 in different potential activation heights owing to the different assembled positions of the activation element 4 on different headrest bodies 2.

FIG. 23A shows a maximum upper assembled position and activation height for the activation element 4. This maximum upper assembled position and activation height is delimited by the upper height detent oH. FIG. 23B shows a central assembled position and activation height for the activation element 4. FIG. 23C shows a maximum lower assembled position and activation height for the activation element 4. This maximum lower assembled position and activation height is delimited by the lower height detent uH. A comparison of FIGS. 23A to 23C highlights that the locking element 8 as a common part is able to be combined with different headrest bodies 2 and resultant different positions of the activation element 4.

The features disclosed in the above description, in the claims and in the figures can be of significance both individually and in combination for the implementation of the invention in its various embodiments, in so far as they remain within the scope of protection of the claims.

LIST OF REFERENCE SIGNS

1 Headrest
2 Headrest body
2.1 Foam material body
2.2 Covering element
3 Support element
3.1 Rod end
3.2 Form-fitting means and force-fitting means
4 Activation element
4.1 Coupling region
4.2 Holding recess
5 Main support element
5.1 Bearing opening
5.1.1 Appendage
5.1.2 Appendage
5.2 Surface side
5.2a Upper surface side
5.2b Lower surface side
5.3 Opening
5.4 Fastening groove
5.5 Corresponding fastening means
6 Holding element
6.1 Recess
6.2 Receptacle
6.3 Fastening means
7 Bearing
7.1 Internal friction face
7.2 Clearance
7.3 Fastening element 7.4 Longitudinal opening
7.5 Rib
7.5.1 Inner longitudinal rib
7.5.2 Inner transverse rib
7.5.3 Outer rib
8 Locking element
8.1 Fastening region
8.2 Locking region
8.3 Activation region
8.3.1 Protruding end
8.3.2 Flexible region
8.3.3 Engagement region
8.3.4 Fastening end
ES Unlocked position
HP Height position
HP1 Lower height position
HP2 Upper height position
oH Upper height detent
uH Lower height detent
S Vehicle seat
VS Locked position
x Longitudinal direction
y Transverse direction
z Vertical direction
ZR Height direction

The invention claimed is:

1. A headrest for a vehicle seat, comprising:
one headrest body;
one support element having at least one rod end for mounting the headrest body;
one main support element having at least one bearing opening through which the rod end is routed, wherein the main support element is connected to the headrest body and conjointly with the latter is height-adjustable relative to the support element; and
one locking element for locking the main support element in an adjusted height position on the support element, wherein the locking element has at least one locking region and one activation region,
characterized in that
the locking region extends so as to be substantially perpendicular to a direction of transverse extent of the main support element;
the locking region in a locked position is releasably secured on the bearing opening;
the activation region extends from the main support element in a height direction; and
the locking region by activating the activation region is movable away from the bearing opening.

2. The headrest as claimed in claim 1, wherein the main support element comprises two mutually spaced-apart bearing openings, and the locking element has two locking regions that correspond to the bearing openings.

3. The headrest as claimed in claim 1, wherein the locking element is formed from a spring wire.

4. The headrest as claimed in claim 1, wherein the at least one locking region and the activation region are integrally configured.

5. The headrest as claimed in claim 1, wherein the locking element is integral and bent from a spring wire.

6. The headrest as claimed in claim 1, wherein the at least one locking region is disposed in the region of the bearing opening.

7. The headrest as claimed in claim 1, wherein the main support element in the region of the at least one bearing opening has a slot-shaped opening, wherein the at least one locking region in a locked state of the main support element is disposed in the opening and is securely engaged with the support element.

8. The headrest as claimed in claim 1, wherein the main support element comprises at least one bearing which is held in the bearing opening of the main support element and by which the headrest body is mounted on the support element so as to be height-adjustable relative to the latter.

9. The headrest as claimed in claim 1, wherein the headrest body comprises a holding element which is disposed on the main support element and conjointly with the latter is displaceable in terms of height relative to the support element.

10. The headrest as claimed in claim 1, wherein the headrest body comprises an activation element which is coupled to the activation region of the locking element.

11. The headrest as claimed in claim 10, wherein the activation element bears on the activation region, or is operatively connected directly or indirectly to the activation region, in such a manner that a movement of the activation region results from a movement of the activation element at least in one direction.

12. The headrest as claimed in claim 1, wherein the activation region has a flexible region, which is able to be pretensioned by activating the locking element, and an engagement region for activating the locking element.

13. The headrest as claimed in claim 12, wherein one end of the activation region connects the flexible region and the engagement region to one another.

14. The headrest as claimed in claim 12, wherein the flexible region and the engagement region in a non-activated state of the activation element are mutually spaced apart and extend so as to be largely mutually parallel.

15. A vehicle seat having at least one backrest and one headrest as claimed in claim 1, wherein said headrest is disposed on the backrest.

* * * * *